United States Patent
Nakagawa

(10) Patent No.: US 7,221,795 B2
(45) Date of Patent: May 22, 2007

(54) DOCUMENT PROCESSING METHOD, RECORDING MEDIUM HAVING RECORDED THEREON DOCUMENT PROCESSING PROGRAM, DOCUMENT PROCESSING PROGRAM, DOCUMENT PROCESSING APPARATUS, AND CHARACTER-INPUT DOCUMENT

(75) Inventor: Masaki Nakagawa, Tokyo (JP)

(73) Assignee: Japan Science and Technology Corporation, Saitama (JP)

( * ) Notice: Subject to any disclaimer, the term of this patent is extended or adjusted under 35 U.S.C. 154(b) by 654 days.

(21) Appl. No.: 10/276,329

(22) PCT Filed: Jun. 1, 2001

(86) PCT No.: PCT/JP01/04673

§ 371 (c)(1),
(2), (4) Date: Jan. 31, 2003

(87) PCT Pub. No.: WO01/93188

PCT Pub. Date: Dec. 6, 2001

(65) Prior Publication Data

US 2003/0113019 A1    Jun. 19, 2003

(30) Foreign Application Priority Data

Jun. 2, 2000 (JP) .............................. 2000-166025

(51) Int. Cl.
*G06K 9/34* (2006.01)

(52) U.S. Cl. .................. 382/176; 382/175; 382/177; 382/179

(58) Field of Classification Search .............. 382/176
See application file for complete search history.

(56) References Cited

U.S. PATENT DOCUMENTS 5,317,504 A * 5/1994 Nakayama .................. 705/30

(Continued)

FOREIGN PATENT DOCUMENTS

JP          56-054576         5/1981

(Continued)

OTHER PUBLICATIONS

Nov. 2003, Zhu et al., "Information Encoding Into and Decoding From Dot Texture For Active Forms," Proc. ACM Symposium on Document Engineering, pp. 105-114.

(Continued)

*Primary Examiner*—Jingge Wu
*Assistant Examiner*—Yuzhen Ge
(74) *Attorney, Agent, or Firm*—Neifeld IP Law, PC

(57) ABSTRACT

A character overlapping with a line of an entry box is extracted utilizing a dot box. At document input step S2, a document to be recognized is read and converted into electronic data to produce character box data. At electronic data storing step S3, the character box data read at the photoelectric transducing S2 is stored. At character detecting step S5, the character box data is contracted, small points are removed, and the remaining pattern is reversely expanded to produce character data. At entry box detecting step S4, entry box position data is generated from the character box data and character data. At relating step S6, a character pattern entered in each entry box is detected from the character data and the entry box position data. At character recognizing step S7, a character is recognized for the extracted character pattern and the results are stored at step S8.

29 Claims, 37 Drawing Sheets

U.S. PATENT DOCUMENTS

| | | | | |
|---|---|---|---|---|
| 5,448,692 | A | * | 9/1995 | Ohta .......................... 715/520 |
| 5,708,730 | A | * | 1/1998 | Itonori ....................... 382/177 |
| 5,815,602 | A | * | 9/1998 | Ueda et al. ................. 382/236 |
| 5,963,661 | A | * | 10/1999 | Kato et al. .................. 382/149 |
| 6,104,833 | A | * | 8/2000 | Naoi et al. .................. 382/190 |
| 6,141,444 | A | * | 10/2000 | Hasegawa ................... 382/175 |
| 6,327,387 | B1 | * | 12/2001 | Naoi et al. .................. 382/190 |
| 6,356,655 | B1 | * | 3/2002 | Sumikawa et al. ......... 382/175 |
| 6,487,597 | B1 | * | 11/2002 | Horie et al. ................ 709/227 |

FOREIGN PATENT DOCUMENTS

| | | |
|---|---|---|
| JP | 63-18786 B2 | 4/1988 |
| JP | 02-156387 | 6/1990 |
| JP | 5-28313 | 2/1993 |
| JP | 06-231305 | 8/1994 |
| JP | 08-190606 | 7/1996 |
| JP | 8-194777 | 7/1996 |
| JP | 08-329187 | 12/1996 |
| JP | 09-185683 | 7/1997 |

OTHER PUBLICATIONS

Sep. 10, 2003, Zhu et al., "Document Image Processing Methods For Active Forms", Proceedings of the 3rd IASTED International Conference Visualization, Imaging, and Image Processing, Benalmadena, Spain.

Aug. 2003, Shinamura et al., "A Prototype Of An Active Form System", Seventh International Conference on Document Analysis and Recognition (ICDAR), Edinburgh, Scotland, pp. 921-925.

* cited by examiner (A)

名前
(NAME)

学校
(SCHOOL)

学生
番号
(STUDENT NUMBER)

DOCUMENT PROCESSING METHOD, RECORDING MEDIUM HAVING RECORDED THEREON DOCUMENT PROCESSING PROGRAM, DOCUMENT PROCESSING PROGRAM, DOCUMENT PROCESSING APPARATUS, AND CHARACTER-INPUT DOCUMENT

TECHNICAL FIELD

The present invention relates to document processing methods, recording media which have recorded thereon a document processing program, document processing programs, and document processing apparatuses. More particularly, the present invention can be applied to the field of information units used in offices, and relates to a document processing method, a document processing program, a recording medium which has recorded thereon the document processing program, and a document processing apparatus which easily recognize characters and symbols (hereinafter collectively called characters) written on documents. In the present invention, documents collectively refer to two-dimensional or three-dimensional sheets or other media made from paper, polymer materials, and so on, and having a surface on which an entry box in which a character is to be written is printed or described.

BACKGROUND ART

In general, it is technically important for document processing apparatuses to extract written characters which overlap with entry boxes. To easily separate the entry boxes and written characters, conventionally, the entry boxes are printed in a dropout color, which can be removed when reading, on condition that a reading apparatus which can distinguish colors is used, or a gray color is used for the entry boxes on condition that a reading apparatus which can distinguish gradation is used. Due to the cost of reading apparatuses, the cost of document printing, and a need for continuing to use existing single-color documents, however, recognizing binary (in many case, black-and-white) documents has been increasing. In these cases, to recognize characters which overlap with a box, a small portion outside the line of the box is detected and this is used as a key to perform a process. It is, however, not easy to solve this issue fundamentally.

There is also a need for reading documents sent through binary facsimile transmission. There have also been increasing demands for improving a method for reading black-and-white documents on which characters are handwritten by ball-point pens or pencils, which serves as a method which can also be used for documents sent through facsimile transmission.

FIG. 37 shows a structural view of a conventional document processing apparatus (see Japanese Examined Patent Publication No. Sho-63-18786).

On a document 101, character entry boxes are printed at lighter gray than characters to be written in the entry boxes. Photoelectric conversion means 2 that can distinguish various levels of darkness performs photoelectric conversion such that the lighter gray of the character entry boxes is converted to a smaller number and the darker gray of the characters are converted to a larger number for a one-line area of the document 101. The number to show the degree of darkness of each pixel in the one-line area obtained as a result of photoelectric conversion (hereafter we call the number as gray level) is stored in storage means 103. The content stored in the storage means 103 is sent to character-entry-box position detection means 104. The character-entry-box position detection means 104 counts the number of pixels having a predetermined gray level along the row direction and the column direction. When the counts exceed predetermined values for the row direction and the column direction, the character-entry-box position detection means 104 determines that character entry boxes are disposed at that position, and sends the character-entry-box position information to character extraction means 105. The character extraction means 105 uses the character-entry-box position information and the stored content sent from the storage means 103 to extract characters.

As described above, in the conventional case, since the character entry boxes are detected and characters are extracted by using the fact that the gray level of the character entry boxes is low, a mark for extracting characters is not required.

DISCLOSURE OF INVENTION

In the conventional method of using a gray level difference, however, when a document is sent via binary facsimile transmission, for example, entry boxes are binarized to "1" or "0," which indicates white or black, according to the relationship between their gray level and a binarization threshold. Depending on the binarization threshold, the entry boxes disappear or the entry boxes have the same gray level as written characters in some cases. Alternatively, a high-performance facsimile machine which can correctly send gray level information is conventionally required.

In consideration of the above-described points, an object of the present invention is to provide a document processing method, a document processing program, a recording medium which has recorded thereon the document processing program, and a document processing apparatus in which entry boxes are output as sets of small dots (hereinafter called dot texture), rather than by color ink or as a gray color, and the entry boxes formed of the dot texture are deleted from the document on which the entry boxes are disposed to extract only written characters. Since documents can be made by lines formed of a set of dots in the present invention, another object of the present invention is to allow black-and-white printers to generate the documents. Still another object of the present invention is to allow most inexpensive binary image readers, facsimile machines, and scanners for reading to input documents. Yet another object of the present invention is to make document production easy by eliminating the need for lines and character-entry-position marks and by making a special document output process unnecessary when printing out.

Generally in documents, the title of an item is printed above or at the left of boxes where the item is to be written. To separate the title from written characters, conventionally the title is printed in a dropout color in the same way as the boxes to separate it, or it is separated by the use of indefinite information that the title is smaller than the written characters.

In consideration of the above-described points, an object of the present invention is to print title characters with dot texture in the same way as the boxes in order to remove the title characters by the same technique as that used to remove the boxes from an image. Another object of the present invention is to separate a written-character-pattern portion from the original image, then, to remove that portion from the original image, and to apply an expansion process to the remaining image to recognize the title characters.

Still another object of the present invention is to express additional information (such as a version, a recognition instruction, and information used for true or false determination) by dot size, dot pitch, and the number of dots, in order to embed information such as an instruction in the dot texture.

As printer technology has advanced in recent years, it has become possible to print characters and lines at variety dot densities. In the present invention, with attention having been paid to the fact that dots can be easily removed by using conventional image processing technology, such as contraction or a technique for measuring the number of linked black components (the number of consecutive black pixels enclosed by white pixels), entry boxes are removed to extract character patterns and entry-box information is used to obtain character positions.

According to first solving means of the present invention, a document processing method including:

a document input step of inputting a document and of generating character box data which includes an entry box formed of a set of dots, and a written character;

a character detection step of detecting character data of the written character according to the character box data generated in the document input step;

an entry-box detection step of detecting entry-box-position data which indicates a position where a character is to be written according to the character box data generated in the document input step;

a relating step of relating the character and the entry box to each other according to the character data detected in the character detection step and the entry-box-position data detected in the entry-box detection step to extract a character pattern for each character; and a recognition step of recognizing each written character according to each character pattern extracted in the relating step, a document processing program for causing a computer to perform the above steps, and a recording medium readable by a computer, having recorded thereon the document processing program are provided.

According to second solving means of the present invention, a document processing apparatus including:

document input means for inputting a document and for generating character box data which includes an entry box formed of a set of dots, and a written character;

character detection means for detecting character data of the written character according to the character box data generated by the document input means;

entry-box detection means for detecting entry-box-position data which indicates a position where a character is to be written according to the character box data generated by the document input means;

relating means for relating the character and the entry box to each other according to the character data detected by the character detection means and the entry-box-position data detected by the entry-box detection means to extract a character pattern for each character; and recognition means for recognizing each written character according to each character pattern extracted by the relating means, is provided.

According to third solving means of the present invention, a document processing method including:

an input step of inputting character box data which includes a title character formed of a set of dots, an entry box formed of a set of dots, and a written character;

a character detection step of detecting character data of the written character according to the character box data input in the input step;

a character-pattern removing step of removing a character pattern detected in the character detection step from the character box data input in the input step according to the character box data;

an expansion step of performing an expansion process to an extent in which adjacent dots become linked; and a recognition step of recognizing the title character in a title in an image obtained in the expansion step, a document processing program for causing a computer to perform the above steps, and a recording medium readable by a computer, having recorded thereon the document processing program are provided.

According to fourth solving means of the present invention, a document processing method including:

an input step of inputting character box data that includes an entry box which is formed of a set of dots and in which information has been embedded by changing such that the set of dots is not uniform, and a written character;

a character detection step of detecting character data of the written character according to the character box data input in the input step;

a character-pattern removing step of removing a character pattern detected in the character detection step from the character box data input in the input step according to the character box data; and a determination step of detecting a change in the set of dots of the entry box according to entry-box data obtained in the character-pattern removing step, to determine the information embedded in the entry box, a document processing program for causing a computer to perform the above steps, and a recording medium readable by a computer, having recorded thereon the document processing program are provided.

BRIEF DESCRIPTION OF THE DRAWINGS

FIG. 14 is an explanatory view of the extraction of written character patterns.

FIG. 15 is an explanatory view of the extraction of titles and entry boxes.

FIG. 21 is an explanatory view obtained when an inverse Fourier transform is applied.

FIG. 22 is an explanatory view obtained when binarization is applied with a determined threshold.

BEST MODE FOR CARRYING OUT THE INVENTION

1. Printing Character Boxes with Dot Texture

Figure 1:
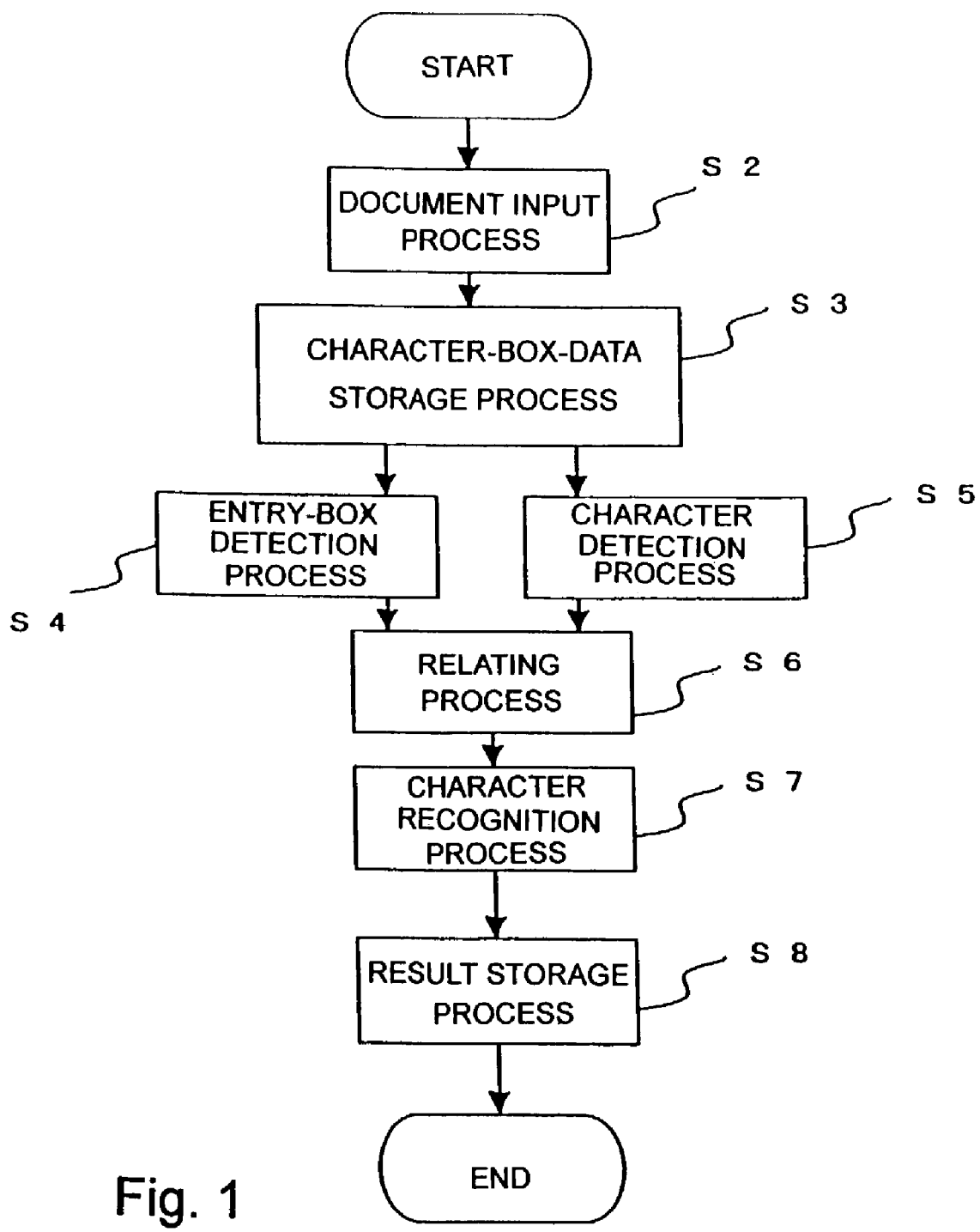
FIG. 1 is a flowchart of a document processing method according to the present invention.
Figure 2:
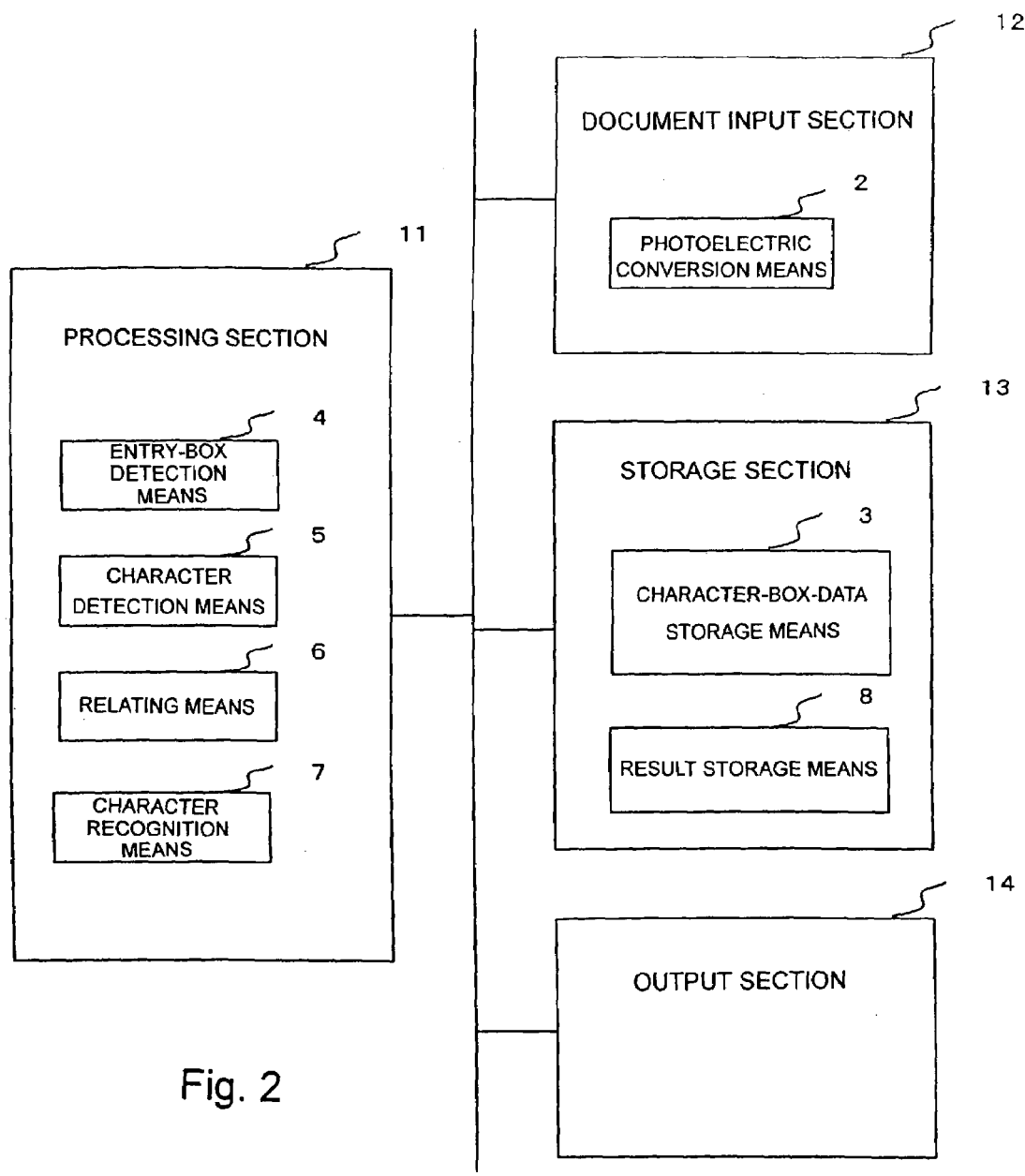
FIG. 2 is a structural view of a document processing apparatus according to a first embodiment of the present invention.
Figure 3:
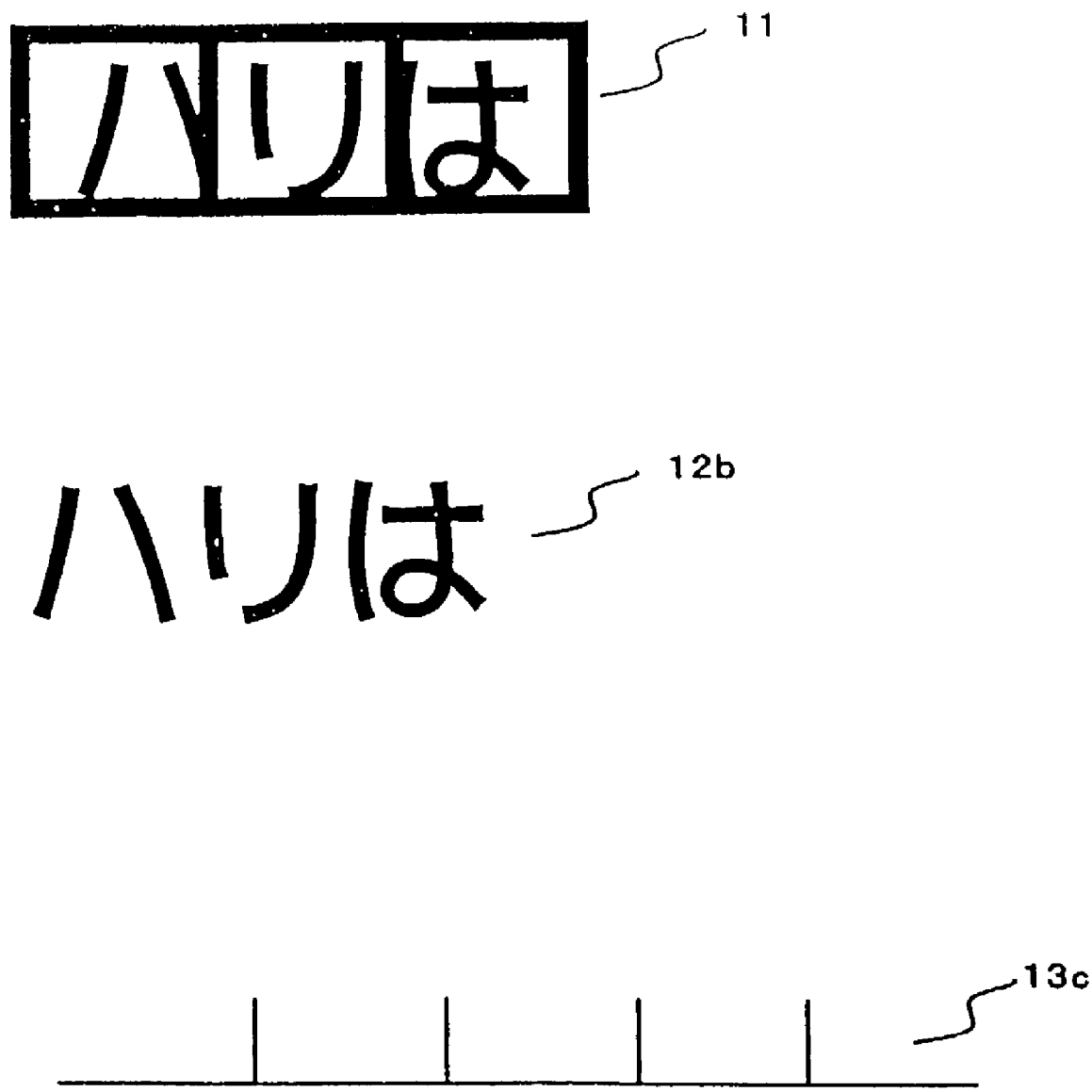
FIG. 3 is an explanatory view related to document processing.

FIG. 1 shows a flowchart of a document processing method according to a first embodiment of the present invention. FIG. 2 shows a structural view of a document processing apparatus according to the first embodiment of the present invention. FIG. 3 shows an explanatory view related to document processing.

The document processing apparatus includes a processing section 11, an input section 12, a storage section 13, and an output section 14. The processing section 11 includes entry-box detection means 4, character detection means 5, relating means 6, and character recognition means 7. The document input section 12 has photoelectric conversion means 2. The storage section 13 has character-box-data storage means 3 and result storage means 8.

With the photoelectric conversion means 2, the document input means 12 reads a document 1 to be recognized, to obtain character box data 11 which includes characters and entry boxes as electronic data (in a document input process S2). The character-box-data storage means 3 stores the character box data 11 read by the photoelectric conversion means 2 (in a character-box-data storage process S3). The character box data 11 detects entry-box position data 13c which indicates a position where characters should be written, by the entry-box detection means 4 (in an entry-box detection process S4). The input data 11 detects character data 12b by the character detection means 5 (in a character detection process S5). In the above description, the character detection process S5 and the entry-box detection process S4 are performed in parallel. The processes may be performed sequentially.

The relating means 6 extracts a character pattern written in each entry box from the character data 12b of written characters and the entry-box position data 13c (in a relating process S6). As a result, the character pattern is recognized by the character recognition means 5 (in a character recognition process S7), and the result of recognition and the entry boxes are related to each other and stored in the result storage means 8 (in a result storage process S8). In the result storage process S8 or after the process, the output section 14 may output or display the result of recognition or data related thereto to or on another apparatus.

Figure 4:
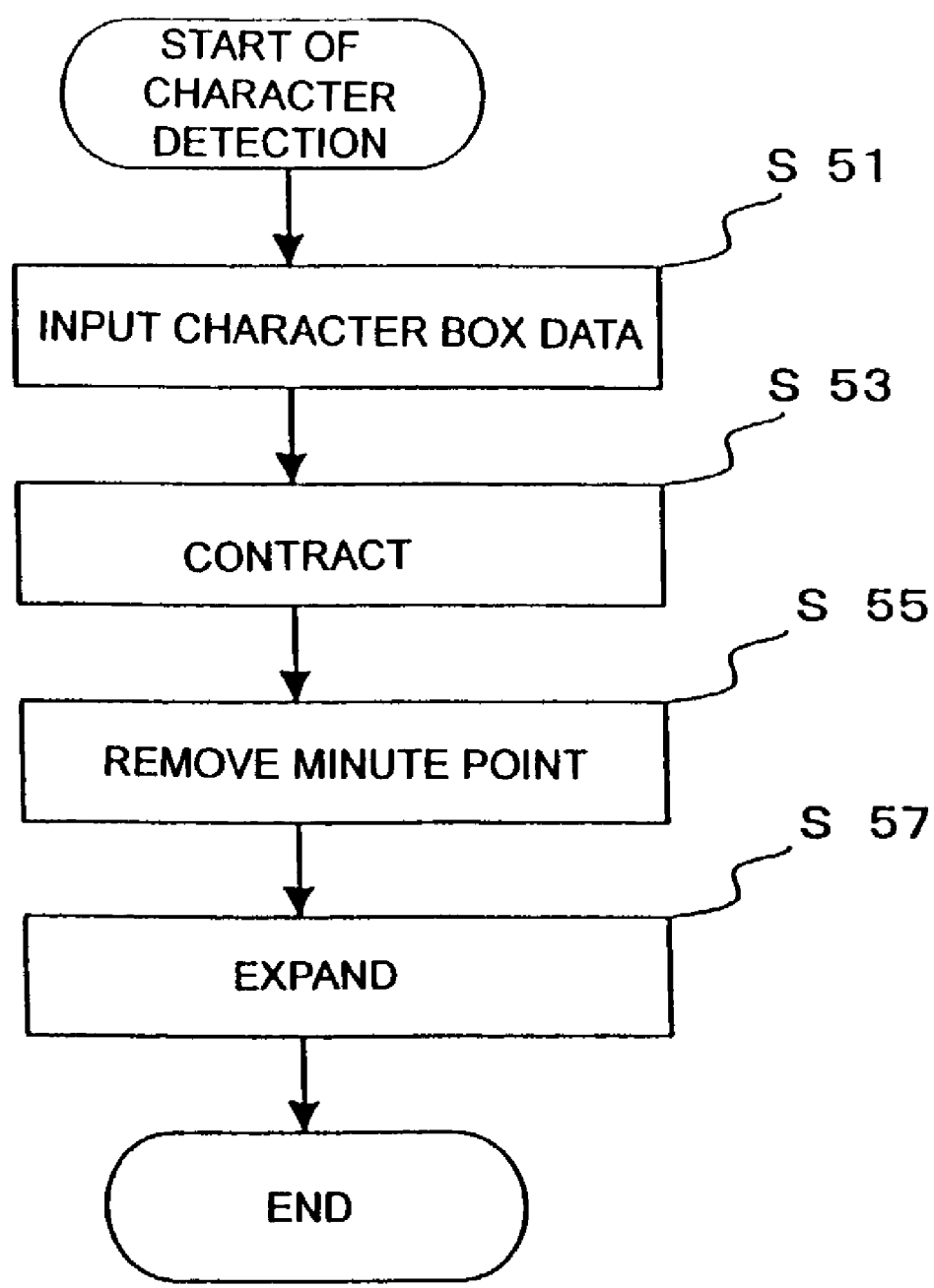
FIG. 4 is a detailed flowchart of a character detection process.
Figure 5:
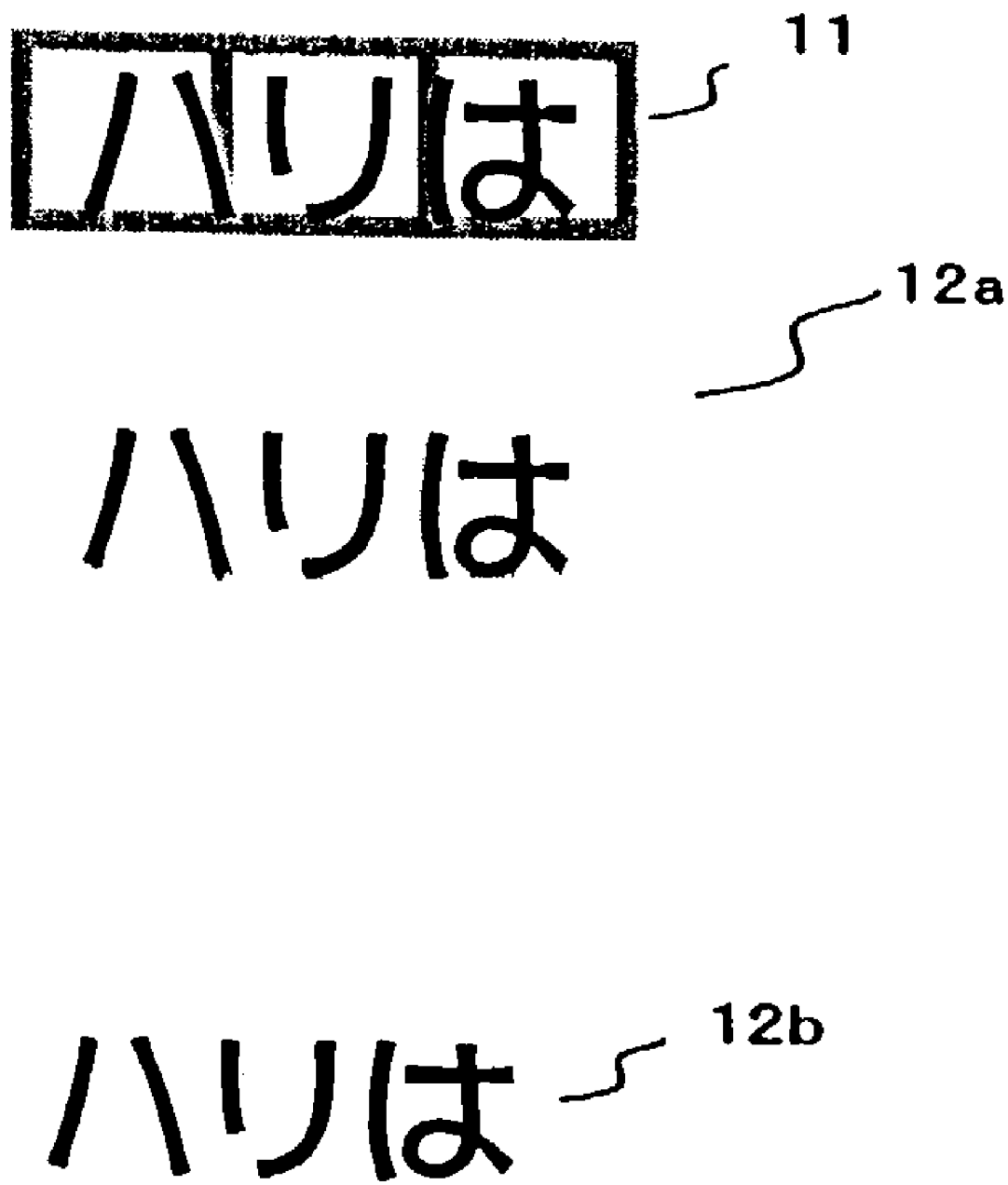
FIG. 5 is an explanatory view for the character detection process.

Next, FIG. 4 shows a detailed flowchart of the character detection process. FIG. 5 shows an explanatory view of the character detection process.

When the character detection process S5 is started, the character box data 11 is input to the character detection means 5 (in S51), and a contraction process is applied (in S53). The contraction process is a process, for example, for contracting the surrounding area (edges) of a link portion where black pixels are linked. In the contraction process, for example, an edge in an input image is extracted, and the edge is changed to have white pixels to obtain a contracted image. The edge is a portion where black pixels disposed adjacent to white pixels are extracted. The contraction process can be further performed by extracting and removing edges made twofold or threefold. Since the entry boxes are formed of dots therein, the contraction process reduces the number of dots whereas it does not affect the written characters much.

Next, minute points are removed from the result 12a of the contraction process (in S55). In a process for removing minute points, for example, link components where black pixels are linked are obtained, the number of black pixels disposed in each link component is obtained, and a link component having a number of black pixels equal to or lower than, a threshold determined in advance is removed. Then, an expansion process is applied to the remaining pattern (in step S57) to obtain the character data 12b of the written characters. In the expansion process, for example, the edges of an input image are extracted, and white pixels disposed adjacent to the black pixels of the edges are changed to black pixels to obtain an expanded image.

Figure 6:
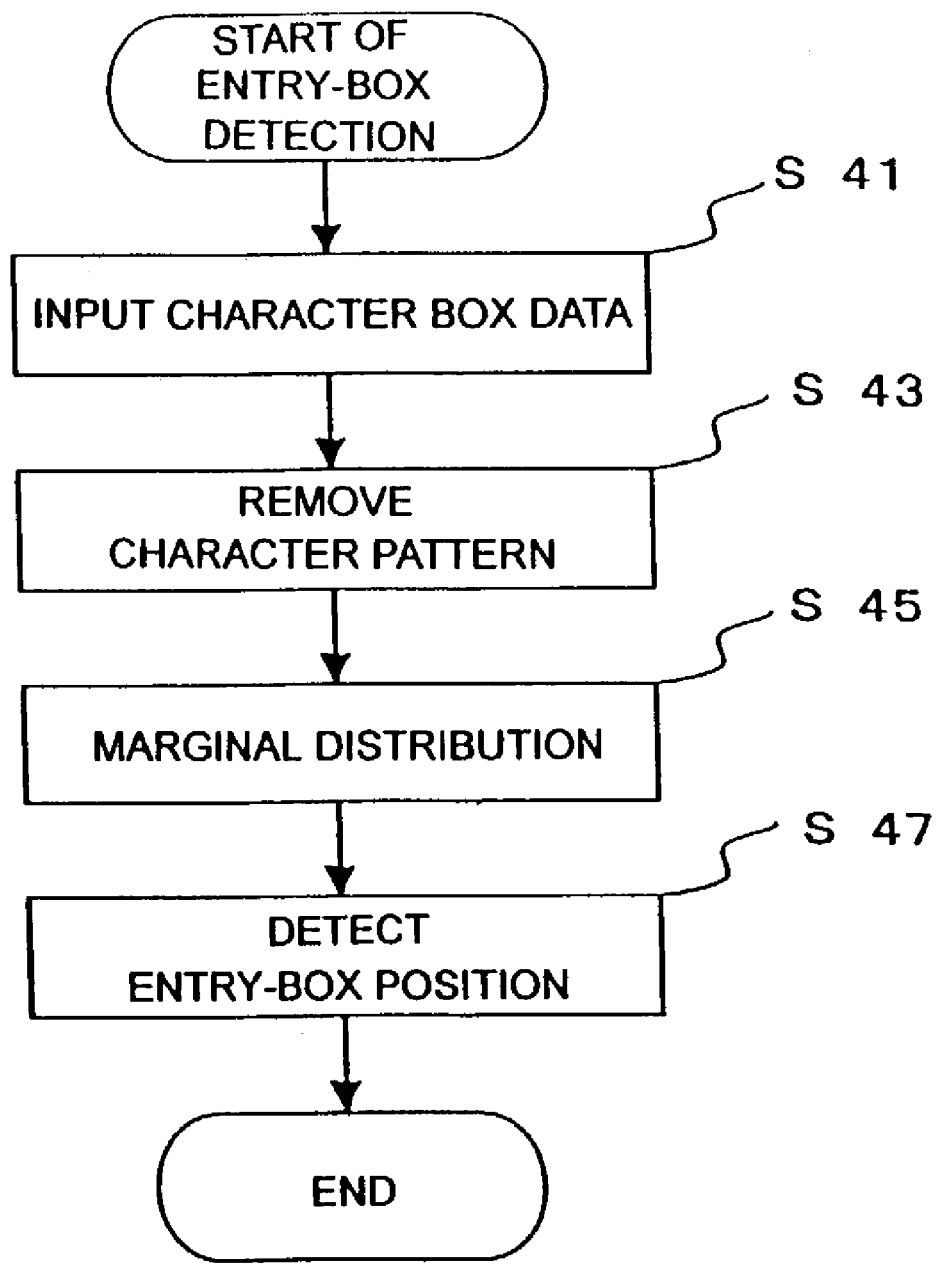
FIG. 6 is a detailed flowchart of an entry-box detection process.
Figure 7:
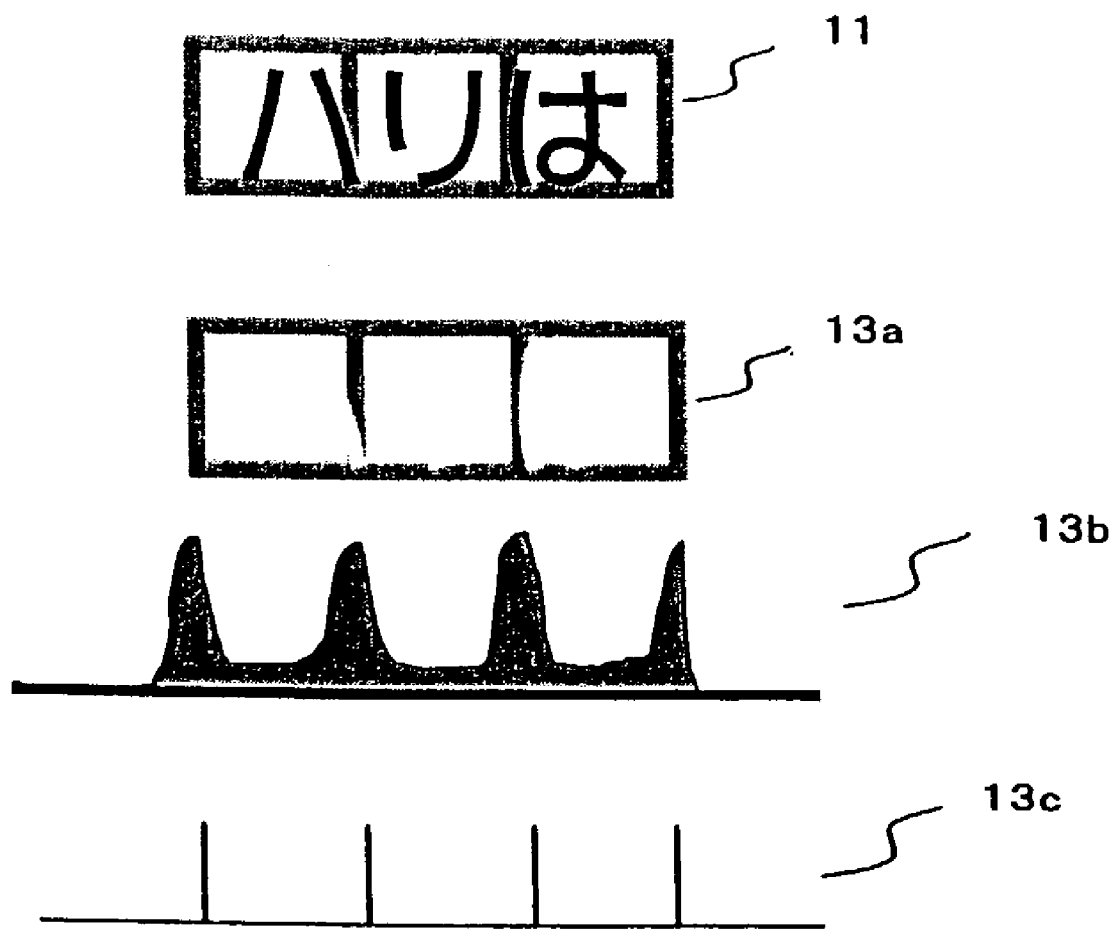
FIG. 7 is an explanatory view for the entry-box detection process.

Next, FIG. 6 shows a detailed flowchart of the entry-box detection process. FIG. 7 shows an explanatory view of the entry-box detection process.

When the entry-box detection process S4 is started, the character box data 11 is input to the entry-box detection means 4 (in S41). Entry-box positions cannot be correctly detected if a vertical marginal distribution is simply taken for the character box data 11 because of the effect of the written characters. Therefore, to remove the effect of the written characters as much as possible, a process for removing character patterns from the character box data 11 is executed to generate entry-box data 13a (in S43). In this process, the pixel of character box data corresponding to the position of each black pixel in the character data 12b detected in the character detection process is changed to a white pixel. Next, the entry-box data 13a is vertically integrated or accumulated to obtain a marginal distribution 13b (in S45). The entry-box position data 13c can be obtained from the marginal distribution 13b (in S47). At this time, for example, fixed-width portions which correlate to peaks of the marginal distribution 13b need to be obtained.

In another method for reducing the effect of the characters written in the entry boxes, edge detection is first performed for the entire character-box data 11, and then, a vertical marginal distribution is obtained to detect the entry-box positions. With this method, the process for removing character patterns can be omitted. The effect is diluted because dot portions generate many edges (a large number of black pixels constituting edges) whereas the written characters only generate edges at their contours. Next, the entry-box data 13a is integrated or accumulated in the row direction to obtain a marginal distribution 13b (in S45). At this time, for example, fixed-width portions which correlate to peaks of the marginal distribution 13b need to be obtained.

Figure 8:
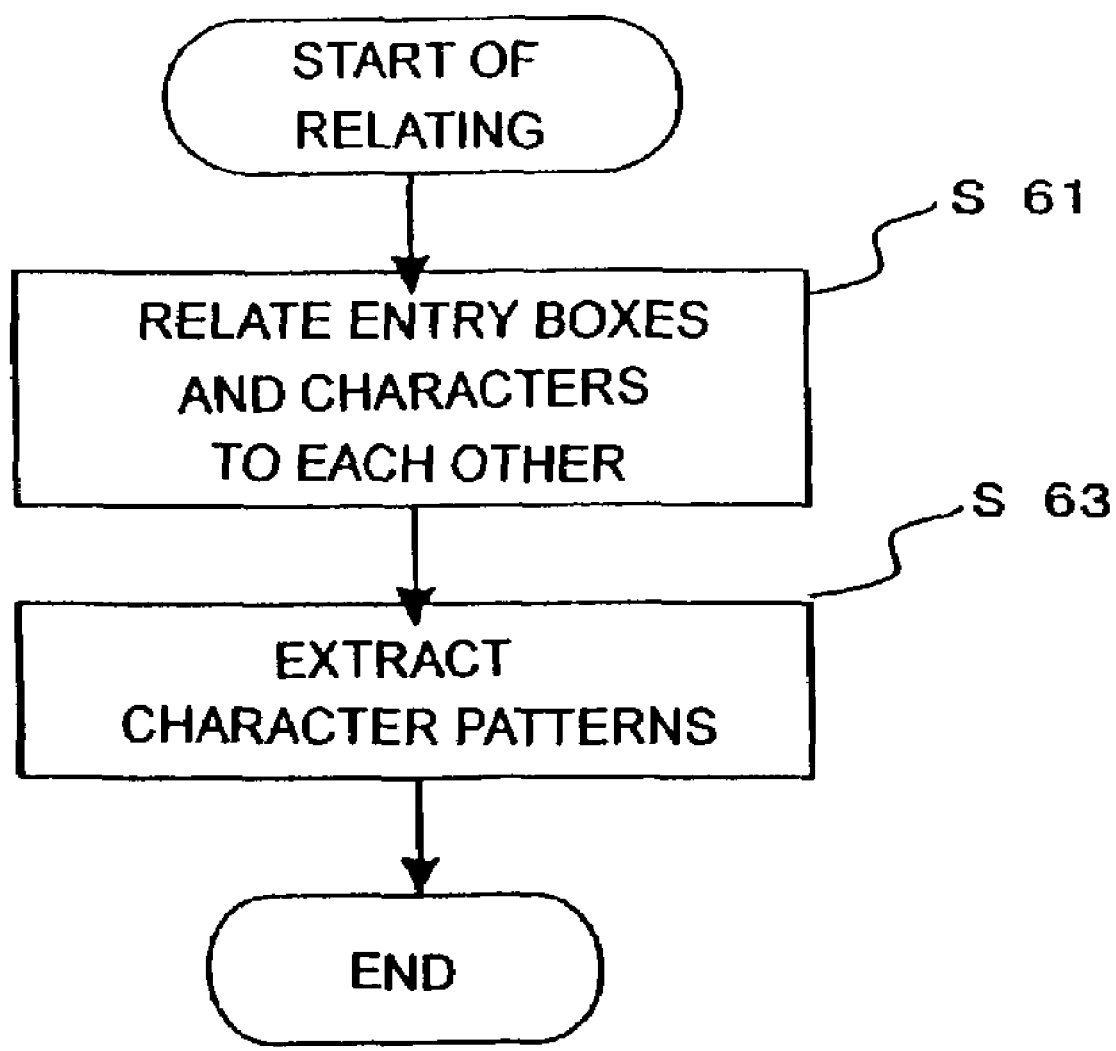
FIG. 8 is a detailed flowchart of a relating process.
Figure 9:
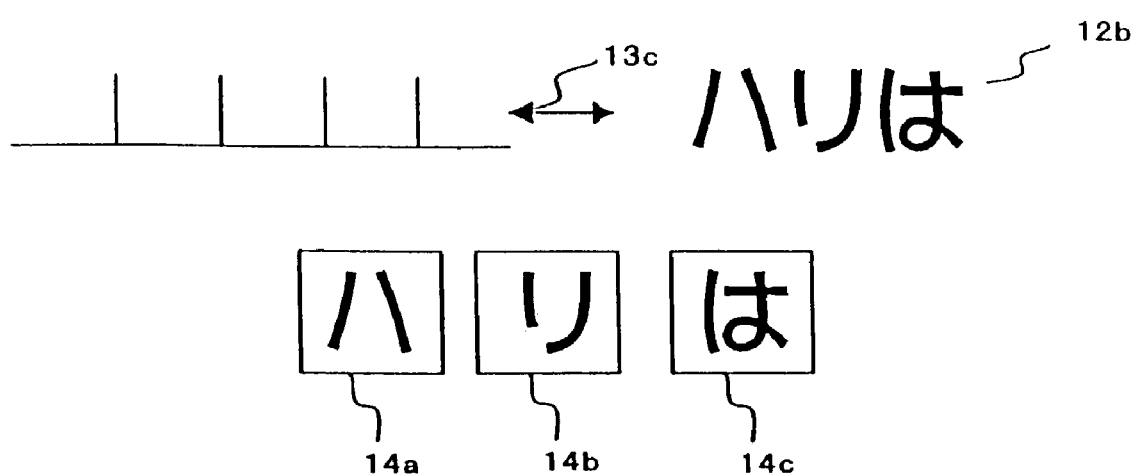
FIG. 9 is an explanatory view for the relating process.

Next, FIG. 8 shows a detailed flowchart of the relating process. FIG. 9 shows an explanatory view of the relating process.

When the relating process S6 is started, the entry-box position data 13c obtained in the entry-box detection process S4 and the character data 12b obtained in the character detection process S5 are input to the relating means 6, and they are related to each other (in S61). With these operations, character patterns 14a to 14c are extracted, one for each character (in S63). The character patterns 14a to 14c can also be extracted in the column direction at the same interval or length. Character recognition is executed according to the character patterns 14a to 14c, one for each character.

When dot texture is applied to entry boxes as in the present invention, the entry boxes can be easily separated by the above-described method even if written characters overlap with the entry boxes.

Figure 10:
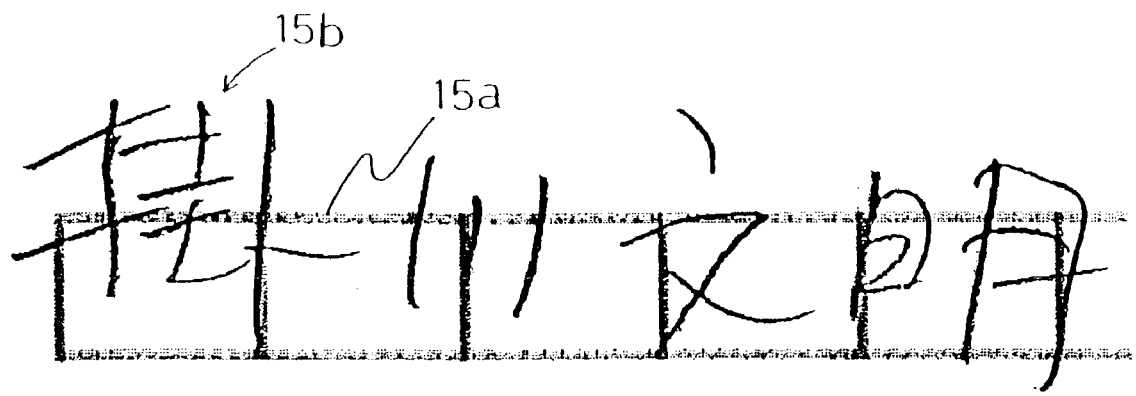
FIG. 10 is an explanatory view showing a case in which written characters are separated in the present invention even when the written characters overlap with entry boxes.
Figure 10:
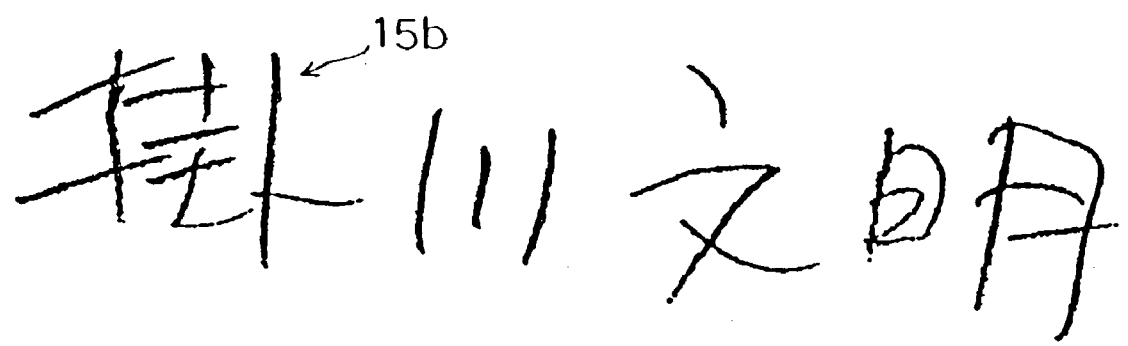

FIG. 10 is an explanatory view showing a case in which entry boxes are separated by the use of the present invention even when written characters overlap with the entry boxes, Even if written characters 15b overlap with entry boxes 15a, as shown in FIG. 10(A), when the above-described embodiment is applied, the entry boxes 15a and the written characters 15b are separated, as shown in FIG. 10(B).

2. Printing Title Characters for Character Boxes with Dot Texture

Next, an embodiment related to printing of title characters for character boxes with dot texture will be described.

Generally in documents, the title of an item is printed above or at the left of boxes where the item is to be written. To separate the title from written characters, conventionally the title is printed in a dropout color in the same way as the boxes to separate it, or it is separated by the use of indefinite information that the title is smaller than the written characters. According to the present embodiment, however, when the title characters are printed with dot texture in the same way as boxes, the title characters can be removed by the same technique as that used to remove the boxes from an image. In addition, it is possible that, after a written-character-pattern portion is separated from the original image, the portion is removed from the original image, and a thickening process (expansion process) is applied to the remaining image to allow the title characters to be recognized.

Figure 11:
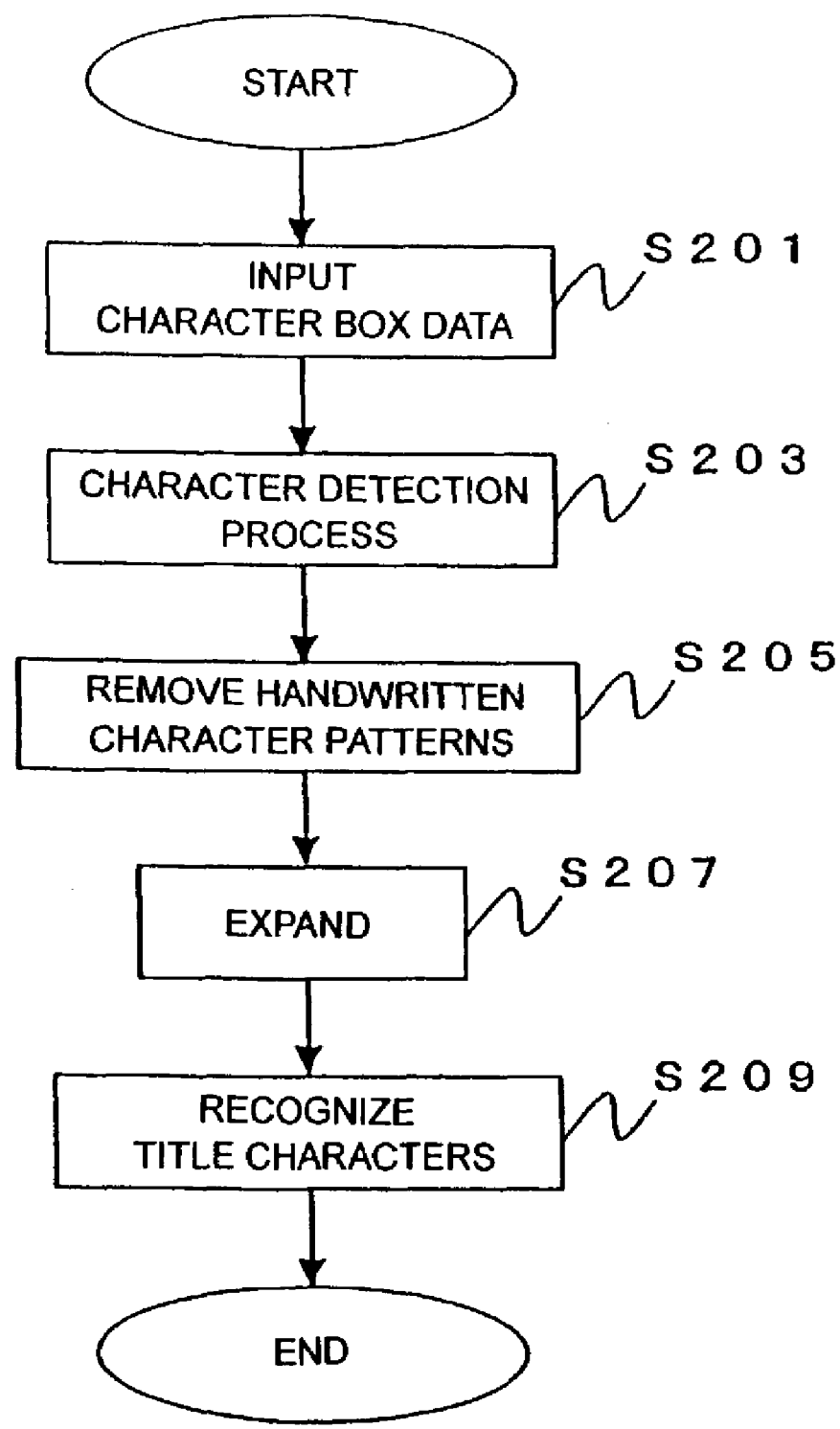
FIG. 11 is a flowchart of basic processing for the separation and recognition of written characters according to a second embodiment.
Figure 12:
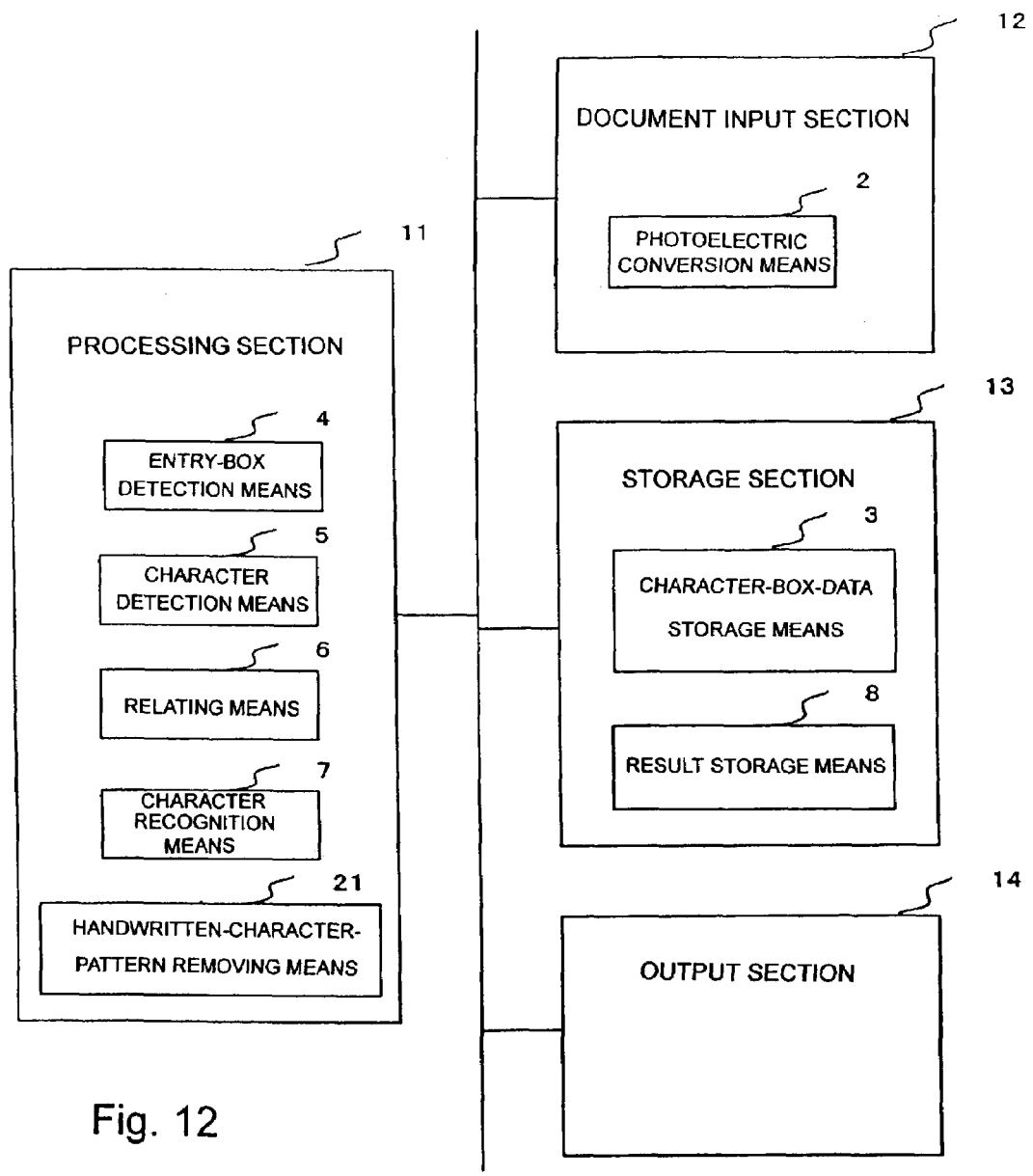
FIG. 12 is a structural view of a document processing apparatus according to the second embodiment of the present invention.

FIG. 11 shows a flowchart of basic processing of separation and recognition of title characters according to a second embodiment. FIG. 12 shows a structural view of a document processing apparatus according to the second embodiment of the present invention. The document processing apparatus includes a processing section 11, an input section 12, a storage section 13, and an output section 14. The processing section 11 includes entry-box detection means 4, character detection means 5, relating means 6, character recognition means 7, and handwritten-character removing means 21. The document input section 12 has photoelectric conversion means 2. The storage section 13 has character-box-data storage means 3 and result storage means 8. The structure of each means is the same as that described in the above-described embodiment except for details such as title-character recognition means 22, which will be specifically described.

Figure 13:
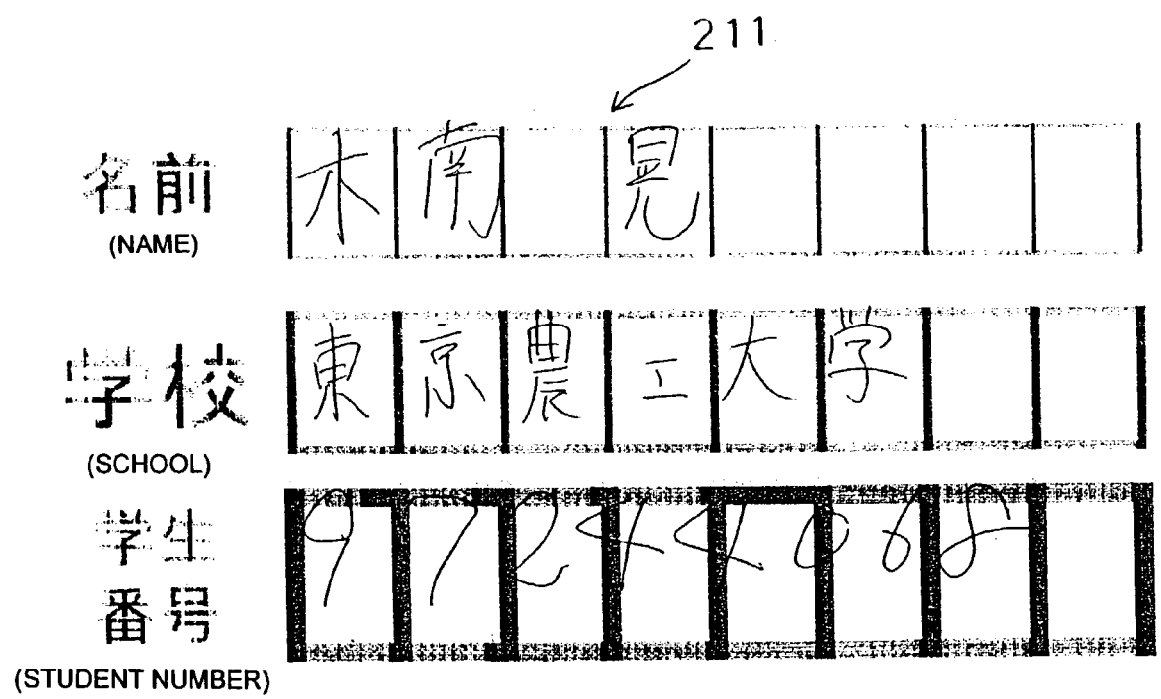
FIG. 13 is an explanatory view of a written example of a dot-texture document.

FIG. 13 shows an explanatory view for an example entry to a dot-texture document.

First, character box data 211 serving as the original image is input to the processing section 11 (in S201). In this case, for example, an input process can be executed as described below in the same way as in the above-described embodiment. The document input means 12 reads a document to be recognized, by using the photoelectric conversion means 2 to obtain character box data 211 which includes characters and entry boxes as electronic data (see the document input process S2 in FIG. 1). The character-box-data storage means 3 stores the character box data 211 read by the photoelectric conversion means 2 (see the character-box-data storage process S3 in FIG. 1). Then, the character box data 211 is input from the character-box-data storage means 3 of the storage section 13 to the processing section 11. In another input process, when the input character box data 211 has already been stored in the character-box-data storage means 3 of the storage section 13, the character box data 211 may be directly input from the character-box-data storage means 3 to the processing section 11 without executing the document input process S2 and the character-box-data storage process S3.

Figure 14:
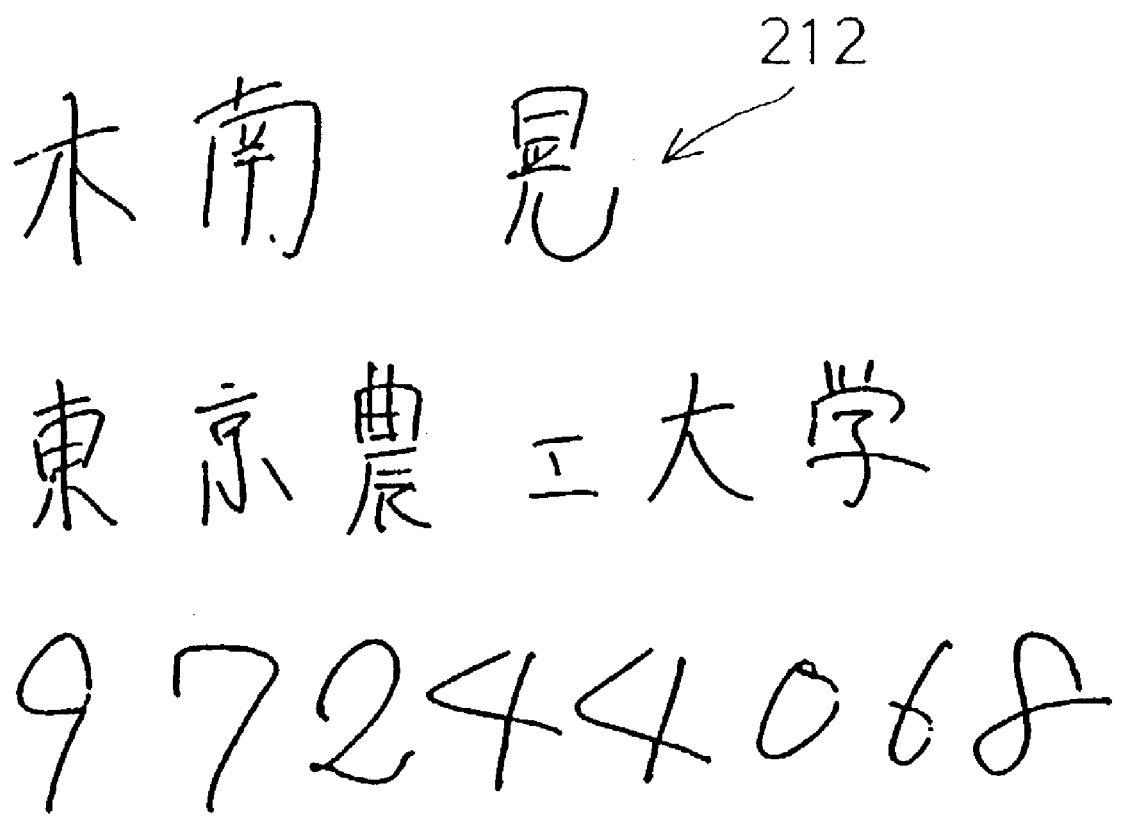

FIG. 14 shows an explanatory view for extraction of handwritten character patterns.

Next, the character detection means 5 executes a character detection process for handwritten character patterns (in S203). Specifically, the character detection means 5 executes the character detection process as described in the detailed flowchart of the character detection process shown in FIG. 4, described above, in the explanatory view of the character detection process shown in FIG. 5, described above, and in the descriptions thereof. With this process, character data 212 of written characters is obtained from the character detection means 5.

According to the input character box data 211, the handwritten-pattern removing means 21 of the processing section 11 removes character patterns 212 detected in the character detection process S203 from the character box data 211 to obtain entry box data which includes titles (in S205).

Figure 15:
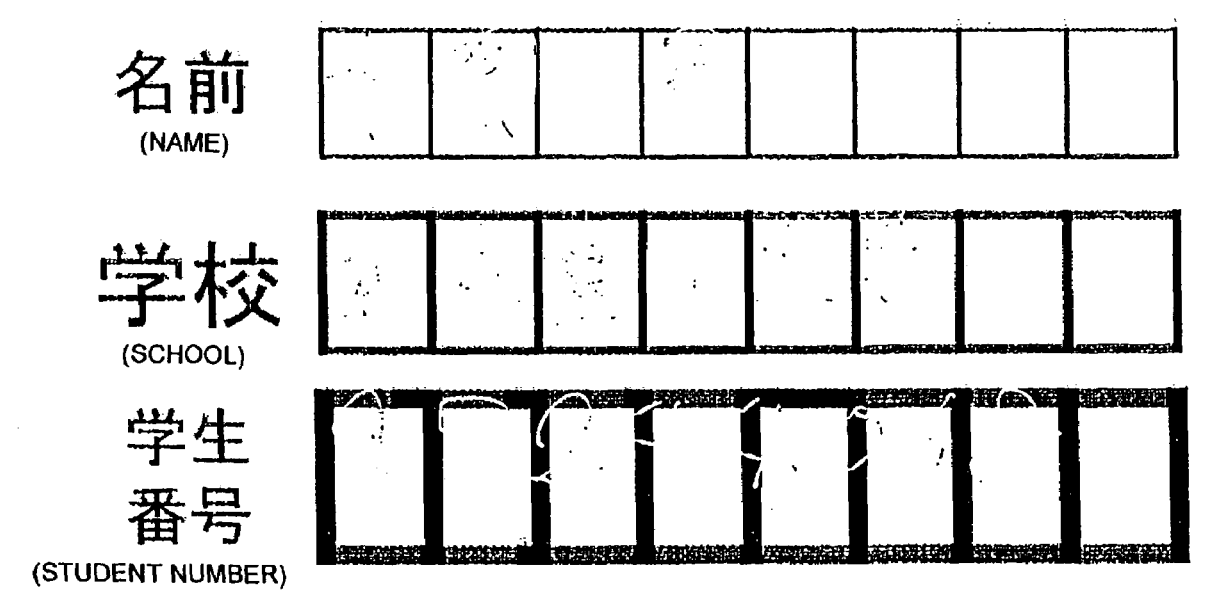

FIG. 15 shows an explanatory view of the extraction of titles and entry boxes. Next, the handwritten-pattern removing means 21 applies a dot expansion process to the obtained entry box data to an extent in which the dot texture is linked (in S207). With this process, the titles and entry boxes shown in the figure are extracted.

Then, the character recognition means 7 recognizes title characters in the extracted titles (or titles and entry boxes) (in S209). When the character recognition means 7 cannot successfully handle noise caused by minute points, the minute-point removal (in step S55) described in FIG. 4 may be executed immediately before or after the expansion process performed by the handwritten-pattern removing means.

Figure 16:
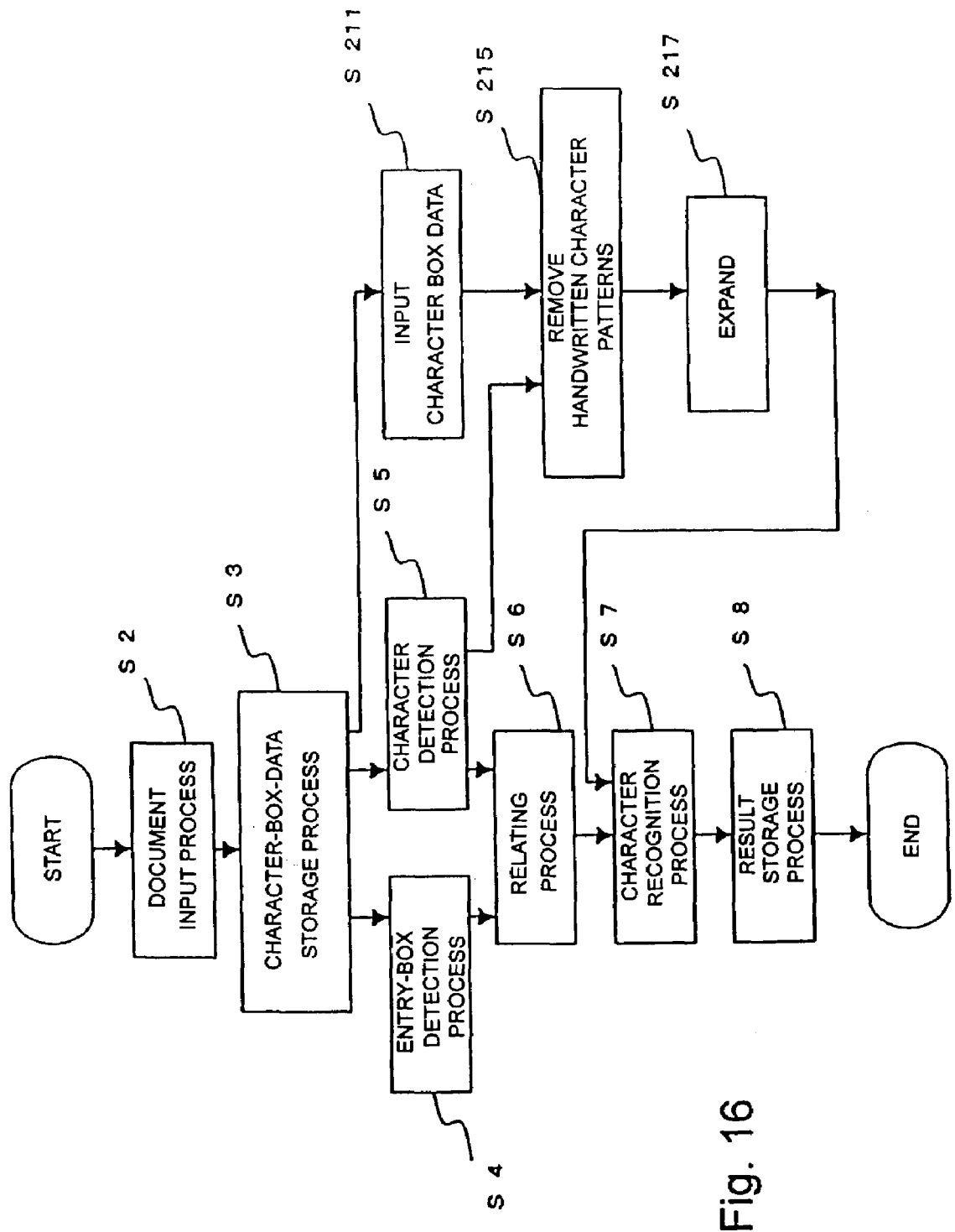
FIG. 16 is a flowchart of processing in which the first embodiment and the separation and recognition of title characters in the second embodiment are combined.

FIG. 16 shows a flowchart of processing in which the first embodiment and separation and recognition of title characters performed in the second embodiment are combined.

In the same way as in the above-described embodiment, the document input process S1 and the character-box-data storage process S2 are first executed. The entry-box detection process S4, the character detection process S5, and the relating process S6 are as described above. At this point, further, the handwritten-pattern removing means 21 reads the character box data stored in the character-box-data storage process S3 from the character-box-data storage means 3, and the data is input as the original image (in S211). Then, the handwritten-pattern removing means 21 uses the character data obtained in the character detection process S5 (by the character detection means 5) to remove handwritten character patterns as described above (in S215). Further, the handwritten-pattern removing means 21 applies the expansion process to the obtained entry box data, which includes titles (in S217). The handwritten-pattern removing means 21 executes a title-character separation process in this way. Further, in the character recognition process S7, the character recognition process is applied not only to handwritten characters obtained in the relating process S6 but also to separated title characters sent from step S217. Further, the character recognition process means 7 stores recognized handwritten characters and recognized title characters in the result storage means 8. When the character recognition means 7 cannot successfully handle noise caused by minute points, the minute-point removal (in step S55) described in FIG. 4 may be executed immediately before or after the expansion process performed by the handwritten-pattern removing means.

Next, the application of dot texture to other objects will be described.

In the present embodiment, advantages obtained when dot texture is applied to document entry boxes have been described. Methods for easily separating handwritten corrections by applying dot texture to documents to be edited have been proposed in Japanese Unexamined Patent Application Publications No. Hei-11-227231 and No. Hei-22-227219, which have already been filed. Therefore, with the use of the present invention, when dot texture is applied to photographs or figures, it is possible to easily separate editing symbols attached thereto to perform corrections indicated by the editing symbols.

3. Methods for Removing Dots, Other than Expansion and Contraction (1) Method Using Fourier Transform In general, dot texture is formed of higher frequency components than handwritten patterns. Therefore, a method can be considered in which the Fourier transform is applied to input character box data (image) to transform it to frequency components, high-frequency components are removed, and then, the remaining components are inversely transformed and binarized to remove the dots.

Figure 17:
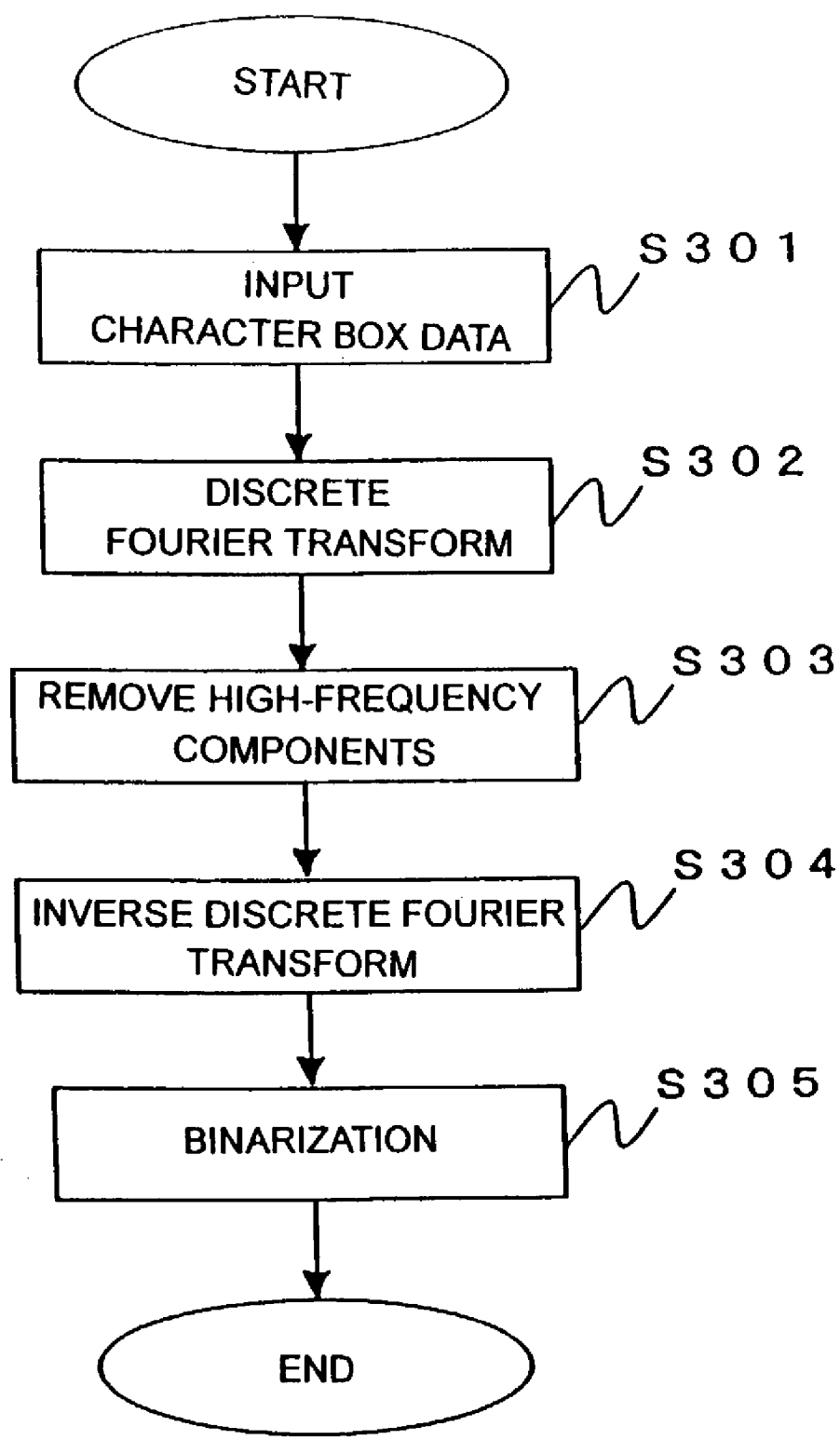
FIG. 17 is a flowchart of dot removal using a Fourier transform.

FIG. 17 shows a flowchart of dot removal which uses the Fourier transform.

Figure 18:
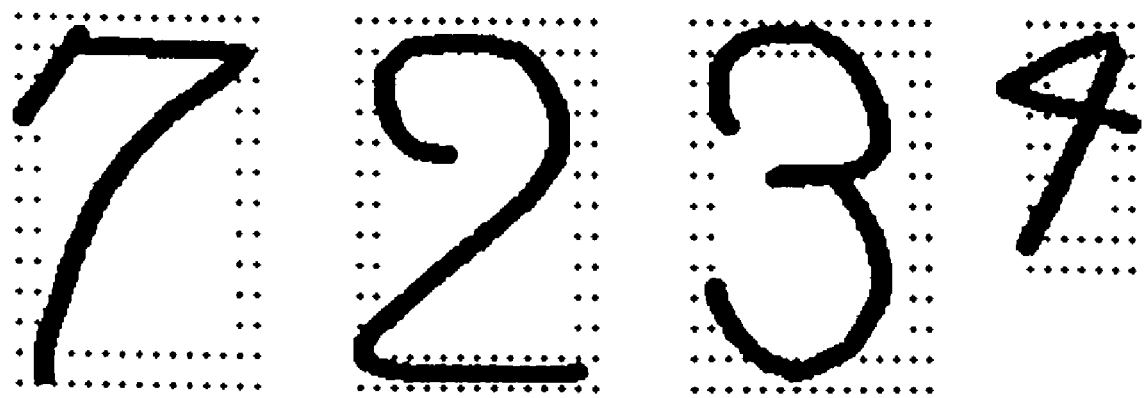
FIG. 18 is an explanatory view of the original image.

The character detection means 5 first reads character box data, serving as the original-image data, stored in the character-box-data storage means 3 (in S301). Alternatively, as described above, it is also allowed that the character box data is stored in the character-box-data storage means 3 by the document input process S2 and the character-box-data storage process S3, and the character box data is then input to the character detection means 5. FIG. 18 shows an explanatory view of the original image.

Figure 19:
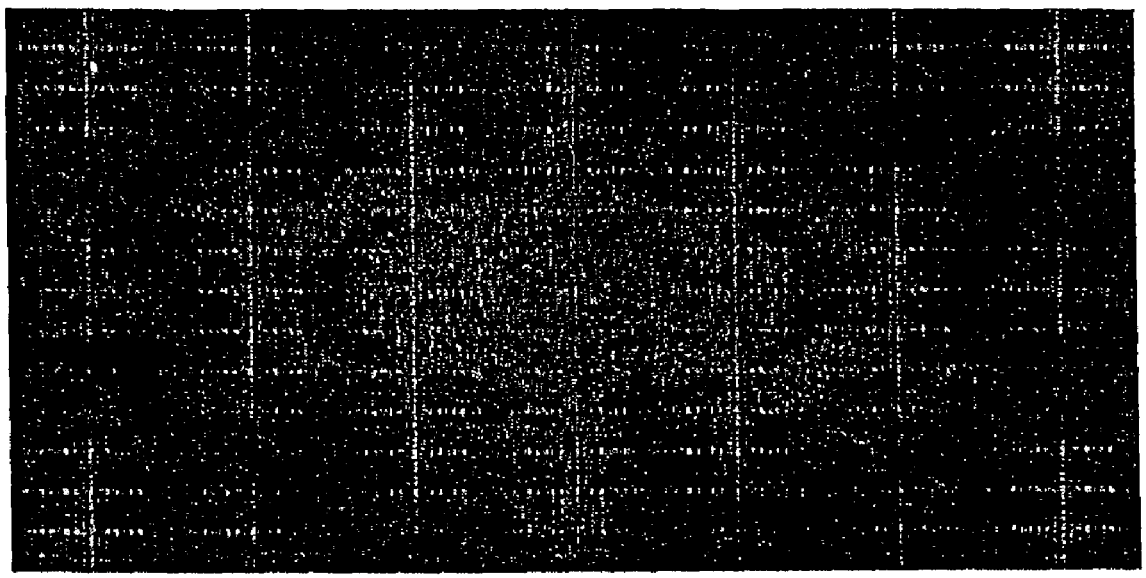
FIG. 19 is an explanatory view obtained when a discrete Fourier transform is applied to the original image.

Then, the character detection means 5 applies the discrete Fourier transform to the read original image (in S302). The original-image data includes, for example, a plurality of scans of data which indicates gradation or black and white obtained when the image is scanned. In this process, changes in the gradation or black and white are discrete-Fourier-transformed. FIG. 19 shows an explanatory view obtained when the discrete Fourier transform is applied to the original image. In this figure, the center serves as the origin, the vertical axis indicates vertical frequency components, and the horizontal axis indicates horizontal frequency components.

Figure 20:
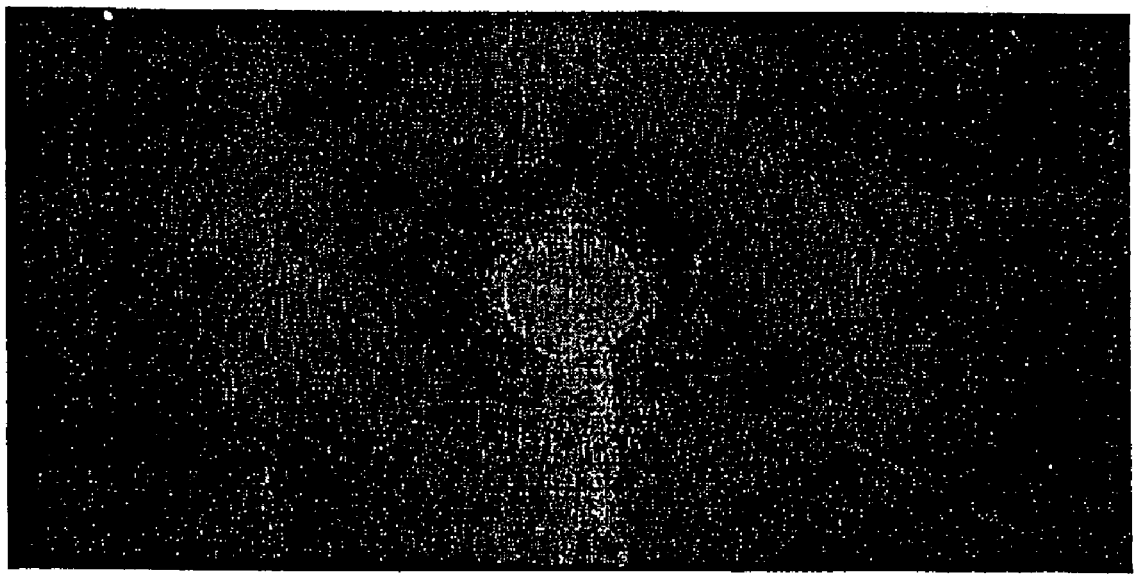
FIG. 20 is an explanatory view obtained when high-frequency components are removed.

Next, the character detection means 5 removes high-frequency components (in S303). With this process, the original image is made to blur. FIG. 20 shows an explanatory view obtained when high-frequency components are removed. In this figure, the center serves as the origin, the vertical axis indicates vertical frequency components, and the horizontal axis indicates horizontal frequency components.

Figure 21:
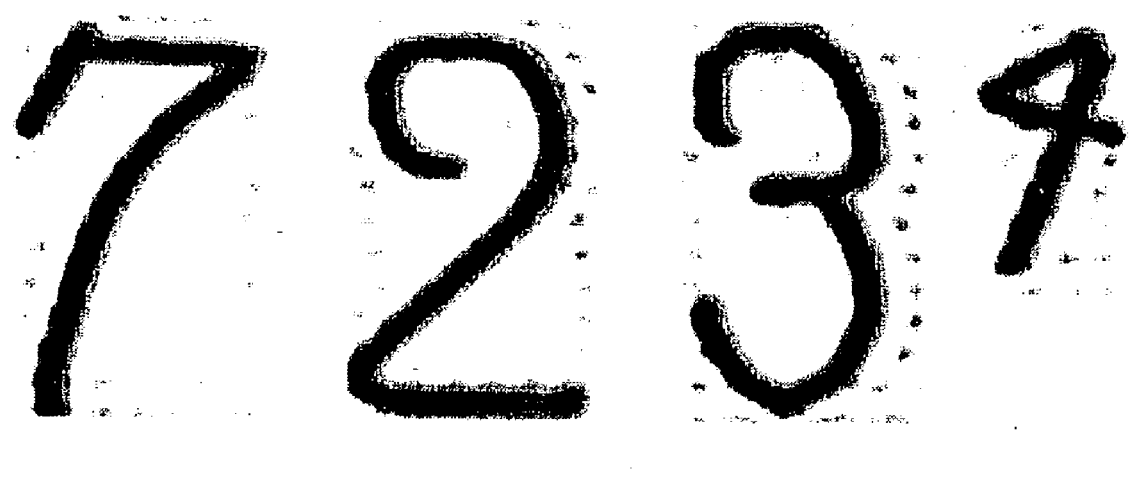
Figure 22:
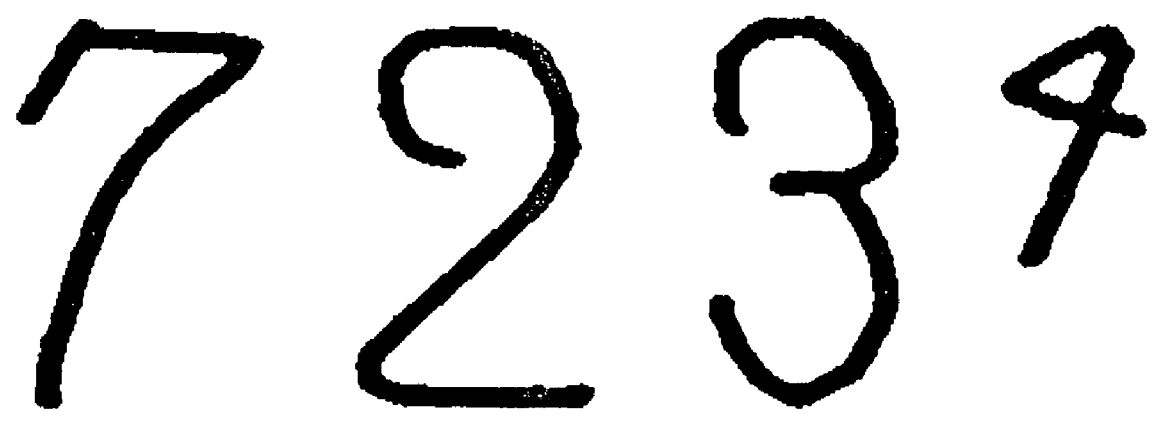

Further, the character detection means 5 executes an inverse discrete Fourier transform (in S304). FIG. 21 shows an explanatory view obtained when the inverse discrete Fourier transform is executed. Then, the character detection means 5 determines a threshold and applies a binarizing process to a blurred image obtained in step S304 (in S305). FIG. 22 is an explanatory view obtained when binarization is performed with the determined threshold.

(2) Method Using Walsh-Hadamard Transform

Whereas Fourier transform divides an image into trigonometric-function frequency components, the Walsh-Hadamard transform divides an image into rectangular-wave frequency components. When the original image is a binary image, the original image is expressed with higher fidelity by the Walsh-Hadamard transform, even over a finite frequency range. With the use of this feature, a method can be considered in which the original image is transformed to rectangular-wave frequency components by the Walsh-Hadamard transform, high-frequency components are removed, and then, the remaining components are inversely transformed and binarized to remove the dots.

Figure 23:
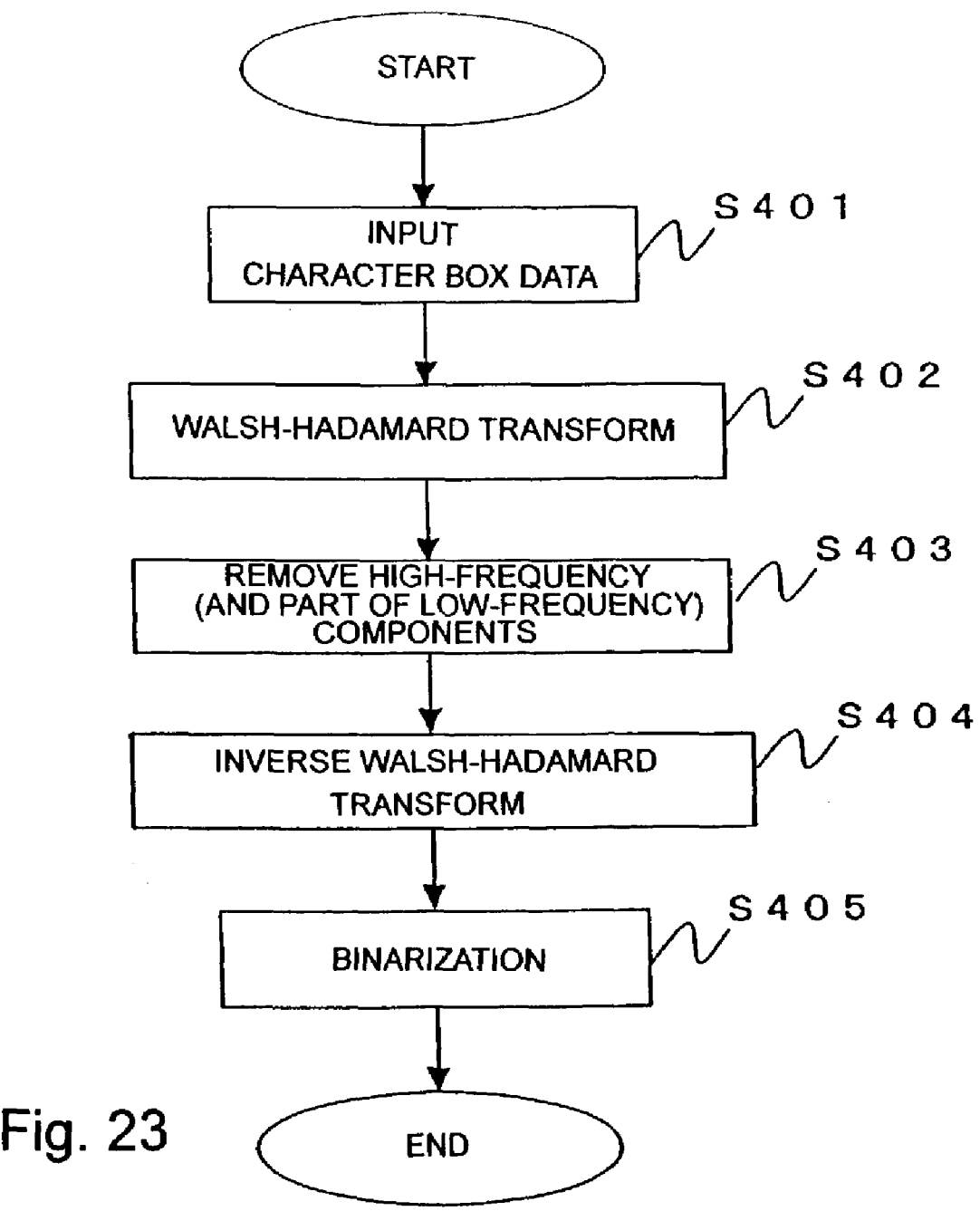
FIG. 23 is a flowchart of dot removal using a Walsh-Hadamard transform.

FIG. 23 shows a flowchart of dot removal which uses the Walsh-Hadamard transform.

Figure 24:
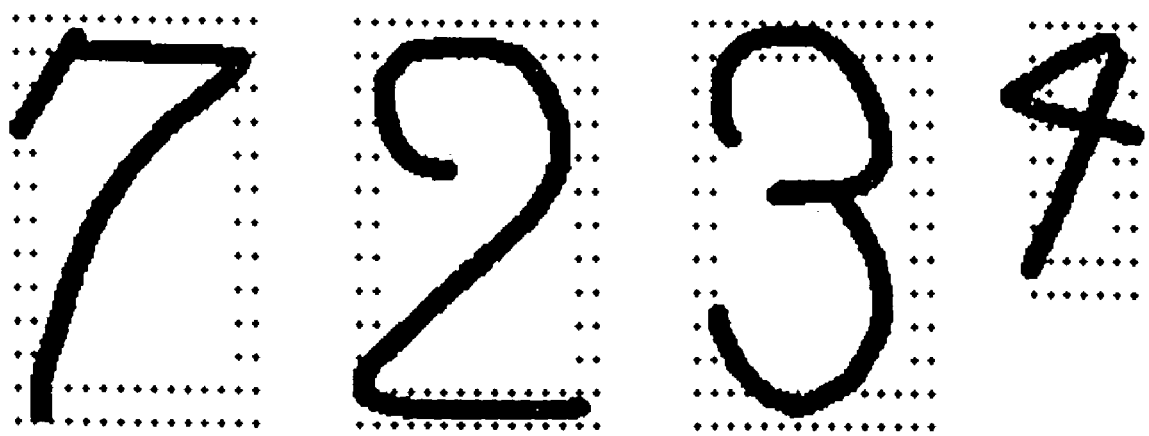
FIG. 24 is an explanatory view of the original image.

The character detection means 5 first reads character box data, serving as the original-image data, stored in the character-box-data storage means 3 (in S401). Alternatively, as described above, it is also allowed that the character box data is stored in the character-box-data storage means 3 by the document input process S2 and the character-box-data storage process S3, and the character box data is input to the character detection means 5. FIG. 24 shows an explanatory view of the original image.

Figure 25:
FIG. 25 is an explanatory view obtained when the Walsh-Hadamard transform is applied to the original image.

Then, the character detection means 5 applies the Walsh-Hadamard transform to the read original image (in S402). The original-image data includes, for example, a plurality of scans of data which indicates black and white obtained when the image is scanned. In this process, changes in the black and white undergo Walsh-Hadamard transformation. FIG. 25 shows an explanatory view obtained when a Walsh-Hadamard transform is applied to the original image. In this figure, the center serves as the origin, the vertical axis indicates vertical frequency components, and the horizontal axis indicates horizontal frequency components.

Figure 26:
FIG. 26 is an explanatory view obtained when high-frequency components (also part of low-frequency components) are removed.

Next, the character detection means 5 removes high-frequency components (in S403). With this process, the original image becomes blurred. In some cases, at-least part of the low-frequency components may be removed. FIG. 26 shows an explanatory view obtained when high-frequency components (and also part of the low-frequency components) are removed. In this figure, the center serves as the origin, the vertical axis indicates vertical frequency components, and the horizontal axis indicates horizontal frequency components.

Figure 27:
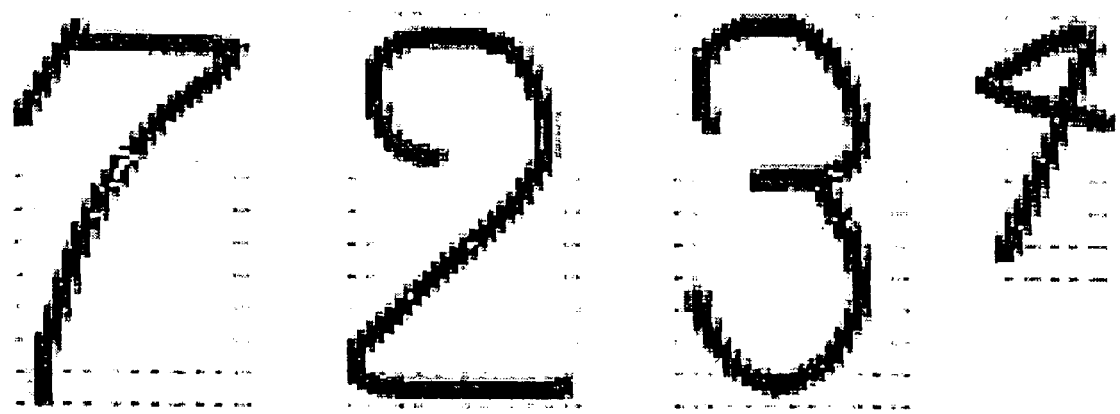
FIG. 27 is an explanatory view obtained when an inverse Walsh-Hadamard transform is applied.
Figure 28:
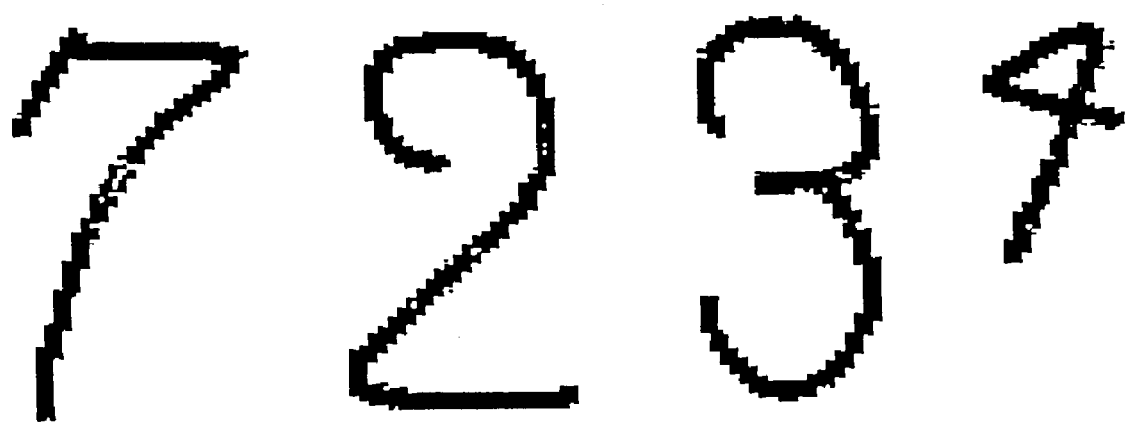
FIG. 28 is an explanatory view obtained when binarization is applied with a determined threshold.

Further, the character detection means 5 executes the inverse Walsh-Hadamard transform (in S404). FIG. 27 shows an explanatory view obtained when the inverse Walsh-Hadamard transform is executed. Then, the character detection means 5 determines a threshold and applies a binarizing process to the blurred image obtained in step S404 (in S405). FIG. 28 is an explanatory view obtained when binarization is performed with the determined threshold.

Figure 29:
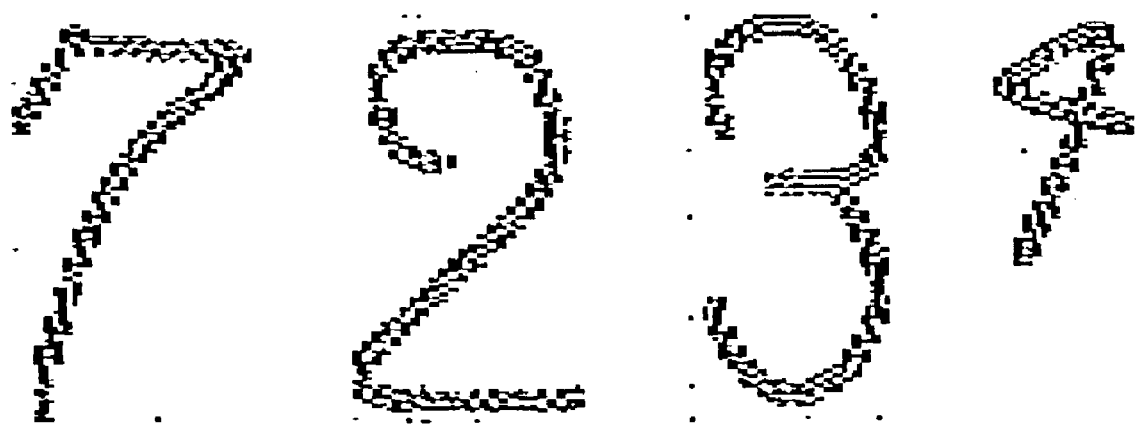
FIG. 29 is an explanatory view obtained when low frequencies are not cut off in the process of step S403.

FIG. 29 is an explanatory view obtained when low-frequency components are not removed in the process of step S403. More specifically, the figure shows character patterns binarized through the processes of steps S404 and S405 after the process of step S403.

Points common to the Fourier transform and the Walsh-Hadamard transform will be clearly described below. First, unless the dots have a constant size and are disposed regularly (namely, periodically), the dot texture generates low-frequency components and noise may be mixed into handwritten entry patterns in the above-described processes. Therefore, it is better when dots have a constant size and are disposed as regularly or as periodically as possible. Second, when special hardware which performs the Fourier transform or the Walsh-Hadamard transform is used, the processing time becomes further shorter than that required for the contraction, minute-point-removal, and expansion processes.

(3) Use of Other Filters Which Cause Images to Blur

A point common to the Fourier transform and the Walsh-Hadamard transform is that the dot texture is made blurry and removal is performed by an appropriate binarizing process. Therefore, it is possible to use various filters to perform an appropriate binarization.

4. Embedding Information in Dot Texture

Embedding information in the dot texture will be described next. In this embodiment, the dot texture is used to express additional information (such as a version, a recognition instruction, and information used for true or false determination) by the dot size, the dot pitch, the number of dots, and others.

Figure 30:
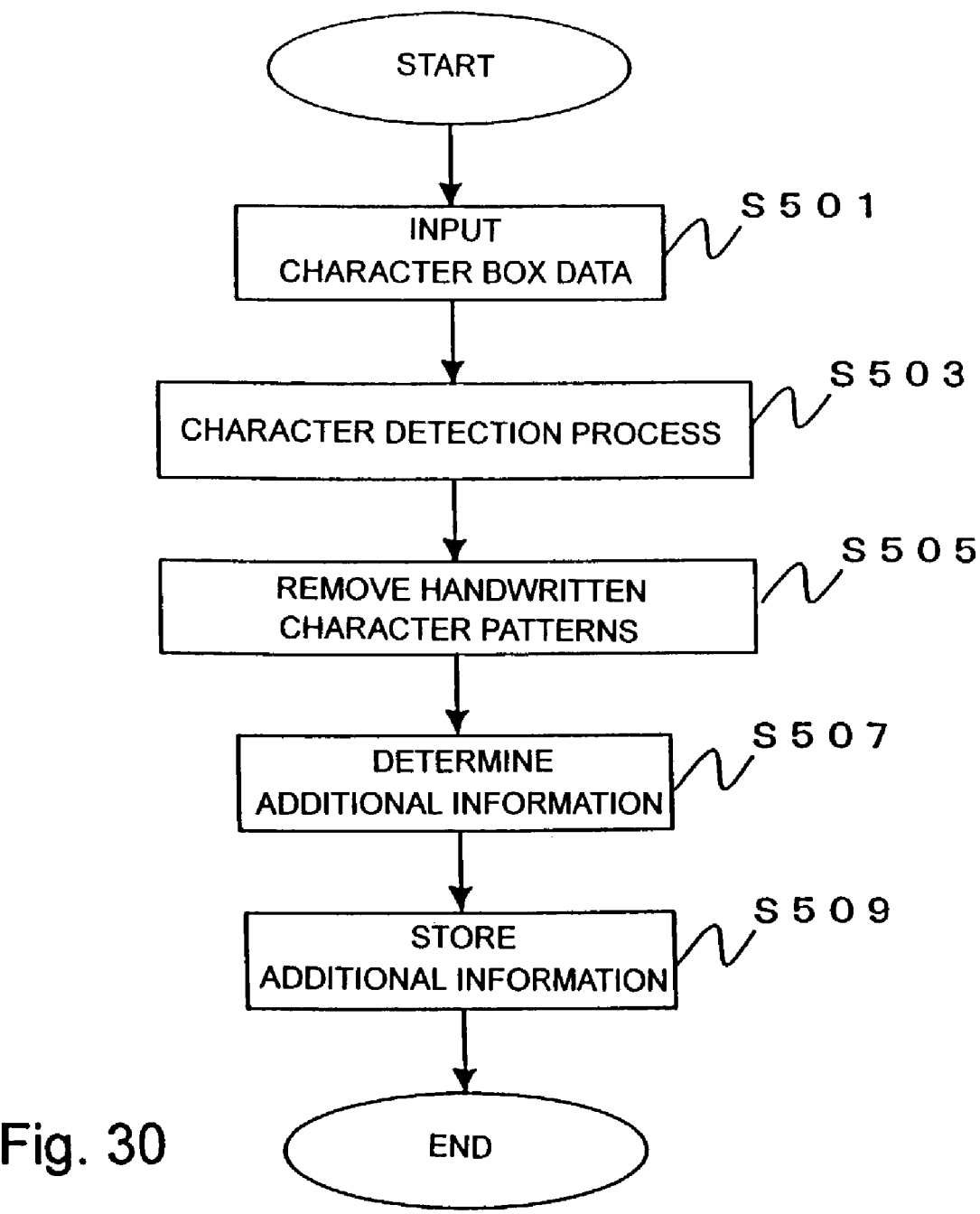
FIG. 30 is a flowchart of embedding information in a dot texture.
Figure 31:
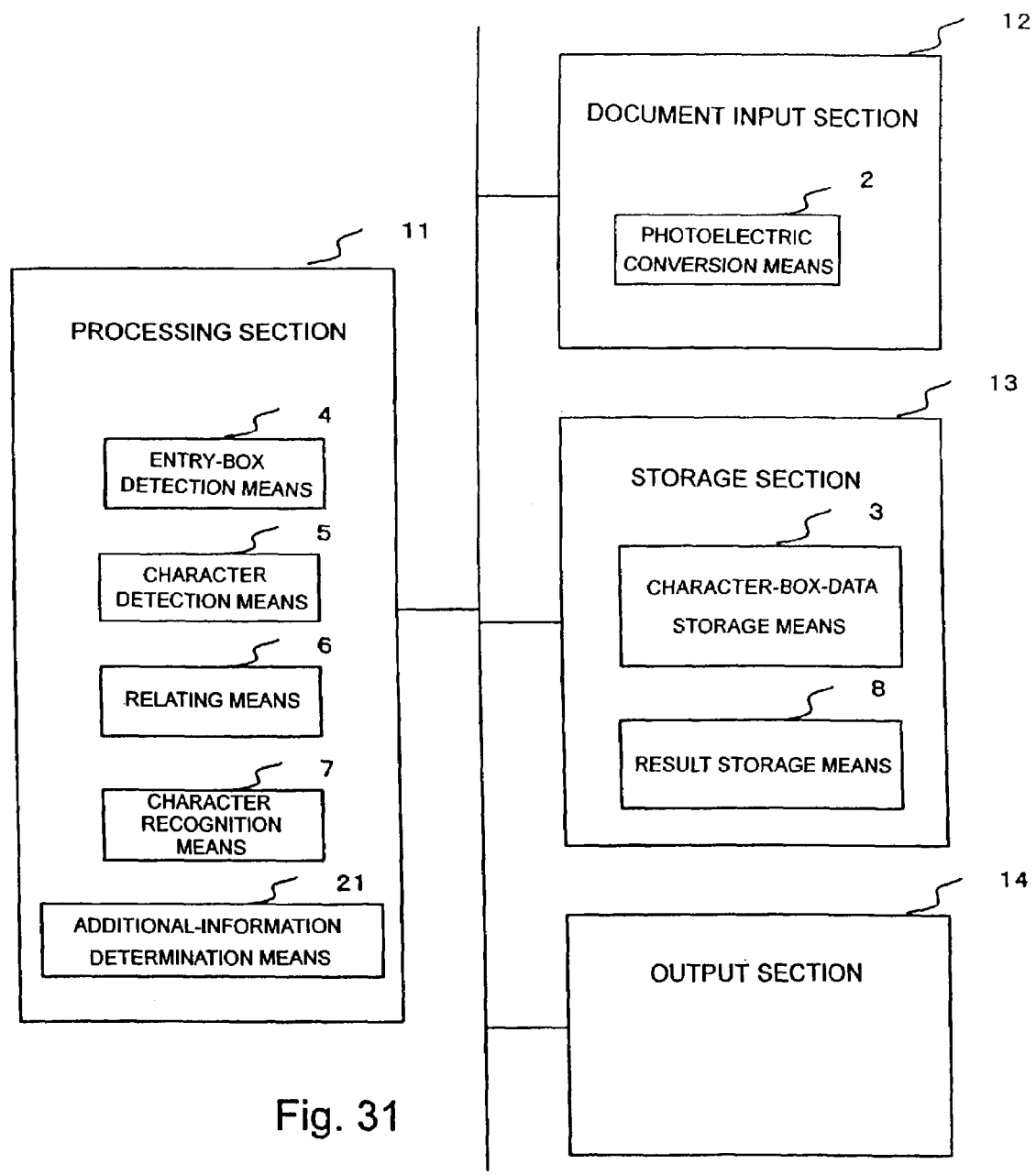
FIG. 31 is a structural view of a document processing apparatus according to a third embodiment of the present invention.

FIG. 30 shows a flowchart of embedding information in the dot texture. FIG. 31 shows a structural view of a document processing apparatus according to a third embodiment of the present invention. The document processing apparatus includes a processing section 11, an input section 12, a storage section 13, and an output section 14. The processing section 11 includes entry-box detection means 4, character detection means 5, relating means 6, character recognition means 7, and additional information determination means 23. The document input section 12 has photo-electric conversion means 2. The storage section 13 has character-box-data storage means 3 and result storage means 8.

First, a character box data 211 serving as the original image is input to the processing section 11 (in S501). In this case, for example, the same input process as that in the above-described embodiment (see step S201) can be executed.

Next, the character detection means 5 executes a character detection process for handwritten character patterns (in S503). Specifically, as in the above-described step S203, character data 212 of written characters is obtained by the character detection means 5.

According to the input character box data, the handwritten-pattern removing means 21 of the processing section 11 removes character patterns 212 detected in the character detection process S203 from the character box data 211 to obtain entry box data which includes titles (in S505).

The additional-information determination means 23 determines the additional information embedded in advance in a predetermined format in the dot texture, such as the obtained entry box data (in S507).

Then, the additional-information determination means 23 stores extracted additional information in the storage section 13 (in S509).

Figure 32:
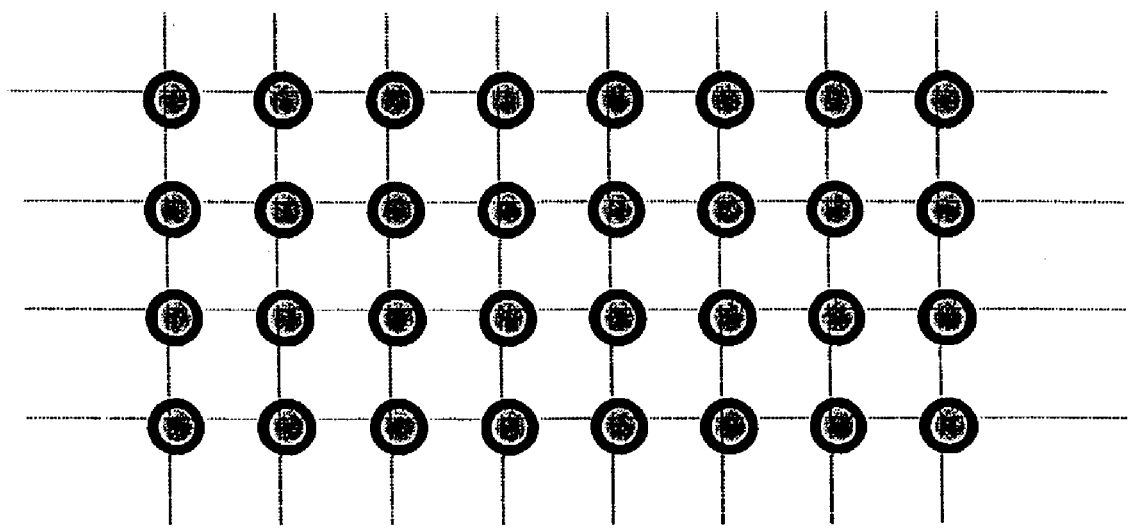
FIG. 32 shows an example dot texture constituting this character box.

FIG. 32 shows an example dot texture constituting the character box. Each means is the same as that in the above-described embodiments except for details such as the additional-information determination means 23, which will be specifically described.

Additional information can be added to the dot texture serving as the original.

As a method for inserting additional information, for example, as additional information, appropriate items are used such as written-character-type information which includes numerals and kanji characters, written-character-data types which include an address, a name, and a year, or information related to character entry boxes, handwritten characters, and titles. Information can be added to a character entry box by changing the size, position, etc. of partial dots of the dot texture shown in the figure. When the information is embedded in the character box at a plurality of positions, even if a portion of them becomes dirty, the information is extracted reliably. Specific examples will be shown below.

Figure 33:
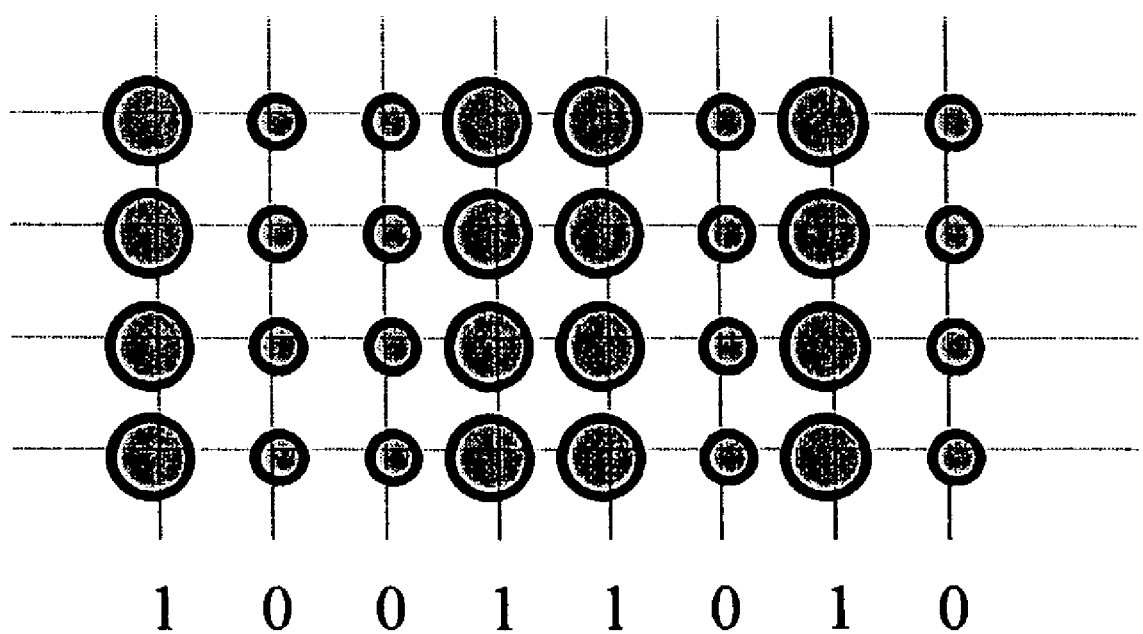
FIG. 33 shows a case in which information is added by changing the dot sizes.

FIG. 33 shows a case in which information is added by changing the dot sizes. For example, information can be embedded at a part of the character box by assigning "1" to large dots and "0" to small dots (or vice versa). In the case shown in the figure, the information "10011010" is embedded in all rows.

Figure 34:
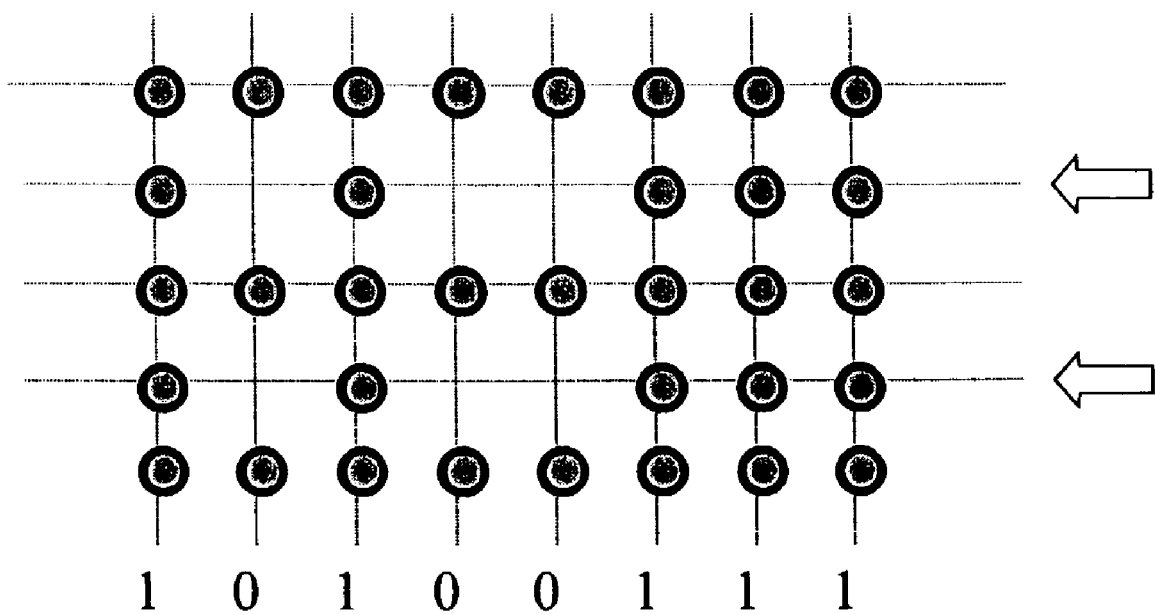
FIG. 34 shows a case in which information is added by whether a dot is disposed or not.

FIG. 34 shows a case in which information is added by whether dots are disposed or not. For example, information can be embedded at a part of the character box by assigning "1" to a state in which a dot is disposed and "0" to a state in which a dot is not disposed. In the case shown in the figure, the information "10100111" is embedded in the rows indicated by arrows.

Figure 35:
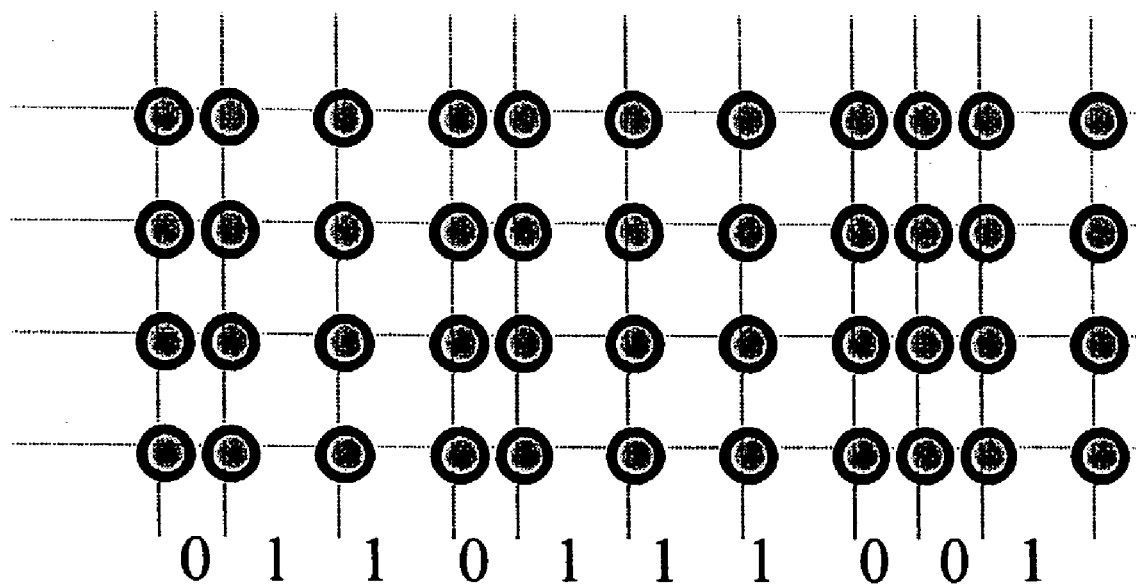
FIG. 35 shows a case in which additional information is embedded by changing the dot pitches.

FIG. 35 shows a case in which information is embedded by changing the dot pitches. For example, information can be embedded at a part of the character box by assigning "1"

to a long dot pitch and "0" to a short dot pitch. In the case shown in the figure, information of "0110111001" is embedded in all rows.

Some methods for adding information have been shown. The methods for adding information are not limited to the above methods. Any methods can be used as long as the dot texture can be modified to embed information. The additional-information processing means 23 can read additional information by the methods determined in advance, from dot texture, such as the entry boxes extracted by the entry-box detection means 4, as described above.

Figure 36:
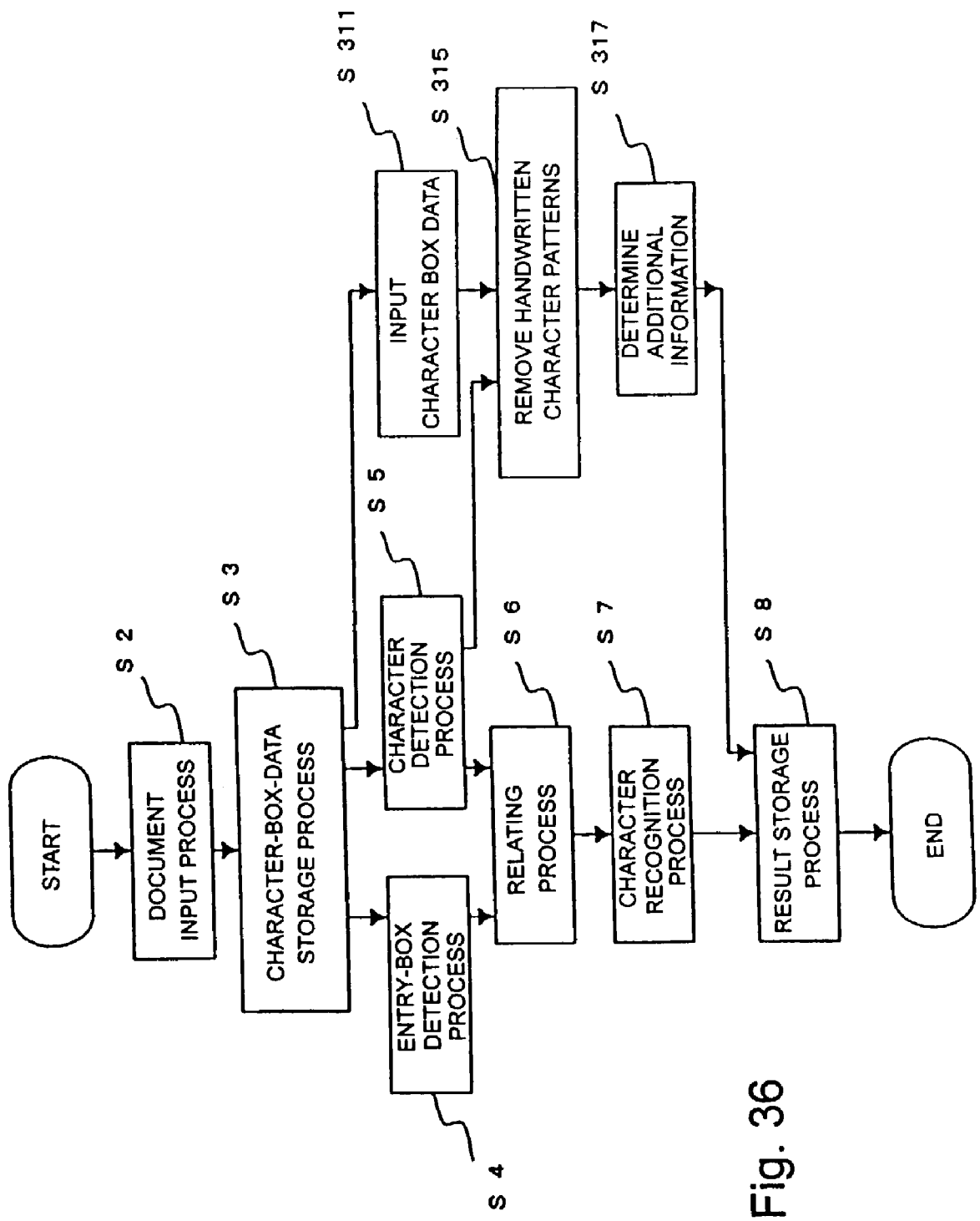
FIG. 36 is a flowchart of processing in which the first embodiment and additional-information embedding according to the third embodiment are combined.
Figure 37:
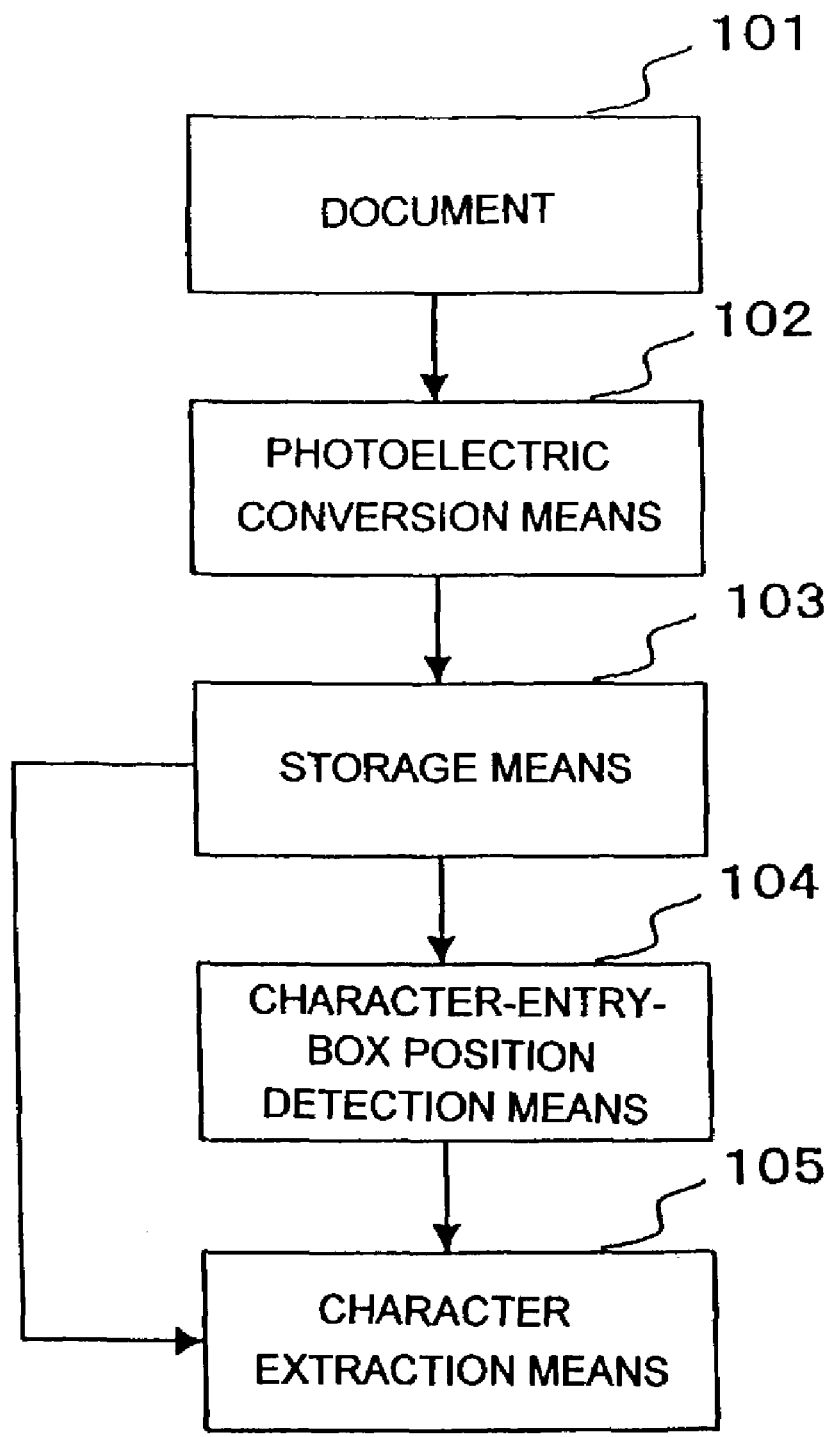
FIG. 37 is a structural view of a conventional document processing apparatus.

FIG. 36 shows a flowchart of processing in which the first embodiment and embedding of additional-information performed in the third embodiment are combined.

In the same way as in the above-described embodiments, the document input process S1 and the character-box-data storage process S2 are first executed. The entry-box detection process S4, the character detection process S5, and the relating process S6 are as described above. Further, the handwritten-pattern removing means 21 reads character box data stored by the character-box-data storage process S3 from the character-box-data storage means 3, and the data is input as the original image (in S311). Then, the handwritten-pattern removing means 21 uses the character data obtained in the character detection process S5 (by the character detection means 5) to remove handwritten character patterns as described above (in S315). Further, the additional-information determination means 23 determines additional information embedded in dot texture such as the obtained entry-box data (in S317). Furthermore, the additional-information determination means 23 stores determined additional information in the result storage means 8.

In the present invention, dots of dot texture may be outline fonts or fonts formed of slanting lines if the boxes are not black all over. A method for performing each process, such as character position detection, entry-box position detection, and recognition, is not limited that described above if the same advantages are obtained.

In the above description, entry-box position information is obtained in the row direction to extract patterns. Entry-box position information can also be obtained in the column direction in the same way. In addition, entry-box positions in both directions may be used to extract characters. With this, entry boxes having a landscape shape or a portrait shape, not a square, can also be handled.

A document processing method according to the present invention can be provided by a computer-readable recording medium which has recorded a document processing program, a program product which includes a document processing program and can be loaded into an internal memory of a computer, a program product which includes a document processing program and which has been stored in a computer-usable recording medium, and others.

INDUSTRIAL APPLICABILITY

According to the present invention, as described above, a document processing method, a recording medium which has recorded thereon a document processing program, and a document processing apparatus which delete entry boxes output in dots, not in color ink or a gray color, from a document having the entry boxes to extract only written characters are provided. In addition, according to the present invention, since documents can be generated by using lines formed of sets of dots, the documents can be produced by black-and-white printers. Further, according to the present invention, documents can be input by general image readers, facsimile machines, scanners, and others for reading. Furthermore, according to the present invention, rows and character-entry-position marks are made unnecessary, and a special document output process is not required when printing out. Therefore, document manufacturing is made easy.

According to the present invention, when title characters are printed by dot texture in the same way as boxes, the title characters can be removed by the same technique as that for removing the boxes from an image. In addition, according to the present invention, it is possible that, after handwritten character pattern portions are separated from the original image, the portions are removed from the original image, and a thickening process is applied to the remaining image to also allow title characters to be recognized.

Further, according to the present invention, when additional information (such as a version, a recognition instruction, and information used for true or false determination) is expressed by the dot size, the dot pitch, and the number of dots, information such as an instruction is embedded in the dot texture.

Each embodiment and modifications thereof can be combined appropriately.

The invention claimed is:

1. A document processing method for processing a character input document, said character input document including a character entry box having a central region and a peripheral region enclosing said central region, said peripheral region of said character entry box including a dot texture, said central region of said character entry box excluding said dot texture, said dot texture defining an array of dots, said array of dots including at least two parallel rows of dots aligned along a first direction, and at least two parallel rows of dots aligned along a second direction, said first direction not parallel to said second direction, and a title character drawn with the dot texture of a line formed of a set of dots arranged two dimensionally and having a width which includes a plurality of dots, comprising:

an input step of inputting an image which includes (1) said character entry box drawn with said dot texture and (2) a written character and (3) said title character;

a character detection step of removing entry-box data formed of the dot texture from the character and box data input in the input step either by prior deletion of each dot constituting the dot texture to that of character data in a contraction process or by removal of a linked component smaller than a predetermined threshold, to detect character data of the written character;

a character-pattern removing step of removing the character data detected in the character detection step from the character and box data input in the input step according to the character and box data to generate the entry-box data;

an expansion step of applying an expansion process to a pattern obtained in the character detection step, to an extent in which adjacent dots become linked;

an entry-box detection step of integrating or accumulating the entry-box data obtained by removing the character data detected in the character detection step from the character and box data input in the input step, in the row direction or in the column direction to obtain a marginal distribution, and of obtaining entry-box-position data from the marginal distribution along a row or a column to detect the entry-box-position data which indicates a position where a character is to be written;

a relating step of relating the character and the entry box to each other according to the character data detected in the character detection step and the entry-box-position data detected in the entry-box detection step to extract a character pattern for each character; and a recognition step of recognizing the title character in a title obtained in the expansion step in the image, and recognizing each written character according to each character pattern extracted in the relating step, and a storage step of storing the title character recognized by the recognition step, and storing each written character recognized by the recognition step by related to the character entry box.

2. A document processing method according to claim 1, wherein the input step comprises:
   a generation step of reading the document to be recognized to generate the character and box data which includes a title, the written character, and the entry box as electronic data,
   a step of storing the generated character and box data in a storage section, and
   a step of reading the character and box data from the storage section.

3. A document processing method according to claim 1, further comprising a step of removing a minute point before or after the expansion step or the step of expanding.

4. The method of claim 1 wherein said first direction is perpendicular to said second direction.

5. A document processing method for processing a character input document, said character input document including a character entry box having a central region and a peripheral region enclosing said central region, said peripheral region of said character entry box including a dot texture, said central region of said character entry box excluding said dot texture, said dot texture defining an array of dots, said array of dots including at least two parallel rows of dots aligned along a first direction, and at least two parallel rows of dots aligned along a second direction, said first direction not parallel to said second direction;
   wherein additional information is embedded in at least one of variations of dot sizes of dots of said dot texture, distance between adjacent dots of said dot texture, and different distances between different adjacent dots of said dot texture;
   said method comprising:
   an input step of inputting an image which includes (1) said character entry box drawn with said dot texture and (2) a written character;
   a character detection step of removing entry-box data formed of the dot texture from the character and box data input in the input step either by prior deletion of each dot constituting the dot texture to that of character data in a contraction process or by removal of a linked component smaller than a predetermined threshold, to detect character data of the written character;
   a character-pattern removing step of removing the character data detected in the character detection step from the character and box data input in the input step according to the character and box data to generate the entry-box data;
   a determination step of detecting a change in the set of dots of the entry box according to the entry-box data obtained in the character-pattern removing step, to determine the additional information embedded in the entry box;
   an entry-box detection step of integrating or accumulating the entry-box data obtained by removing the character data detected in the character detection step from the character and box data input in the input step, in the row direction or in the column direction to obtain a marginal distribution, and of obtaining entry-box-position data from the marginal distribution along a row or a column to detect the entry-box-position data which indicates a position where a character is to be written;
   a relating step of relating the character and the entry box to each other according to the character data detected in the character detection step and the entry-box-position data detected in the entry-box detection step to extract a character pattern for each character; and
   a recognition step of recognizing each written character according to each character pattern extracted in the relating step, and
   a storage step of storing the additional information determined by the determination step, and storing each written character recognized by the recognition step by related to the character entry box.

6. A document processing method according to claim 5, wherein the additional information is embedded in the entry box by changing the dot size.

7. A document processing method according to claim 5, wherein the additional information is embedded in the entry box based upon whether a dot is disposed or not.

8. A document processing method according to claim 5, wherein additional information is embedded in the entry box by changing the dot pitch.

9. A document processing method according to claim 1 or 5, wherein the character detection step comprises:
   a step of contracting the surrounding of a linked portion where black pixels are linked, in the character and box data input in the input step;
   a step of removing a point smaller than a threshold determined in advance; and
   a step of expanding the remaining pattern in order to obtain the character data of the character written in the document.

10. A document processing method according to claim 1 or 5, wherein the character detection step comprises:
    a step of reading the character and box data;
    a step of transforming the read character and box data to data indicating frequency components;
    a step of removing high-frequency components, or removing high-frequency components and at least part of low-frequency components;
    a step of inverse-transforming the transformed data indicating the frequency components; and
    a step of applying a binarizing process with a predetermined threshold to a blurred image obtained by inverse transform.

11. A document processing method according to claim 10, wherein a transform to the frequency components is a discrete Fourier transform, and the inverse transform is an inverse discrete Fourier transform.

12. A document processing method according to claim 10, wherein a transform to the frequency components is a Walsh-Hadamard transform, and the inverse transform is an inverse Walsh-Hadamard transform.

13. A document processing method according to claim 1 or 5, wherein the relating step comprises:
    a step of relating the character data obtained in character detection step to the entry-box-position data obtained in the entry-box detection step; and
    a step of extracting the character pattern for each character according to the relationship between the character data and the entry-box-position data.

14. A document processing method according to claim 1 or 5, wherein the entry-box detection step obtains the entry-box-position data along both a row and a column, and the relating step extracts the character pattern according to the entry-box-position data along both the row and column.

15. A document processing method according to claim 1 or 5, wherein the character and box data comprises image information such as photographs or figures made from a dot texture formed of a set of dots.

16. A document processing method according to claim 15, further comprising a step of performing a correction process for a handwritten character recognized in the recognition step, according to a character.

17. The method of claim 5 wherein said first direction is perpendicular to said second direction.

18. A recording medium readable by a computer, having recorded thereon a document processing program for instructing a machine for processing a character input document, wherein said character input document includes a character entry box having a central region and a peripheral region enclosing said central region, said peripheral region of said character entry box including a dot texture, said central region of said character entry box excluding said dot texture, said dot texture defining an array of dots, said array of dots including at least two parallel rows of dots aligned along a first direction, and at least two parallel rows of dots aligned along a second direction, said first direction not parallel to said second direction, and a title character drawn with the dot texture of a line formed of a set of dots arranged two dimensionally and having a width which includes a plurality of dots, comprising:

an input step of inputting an image which includes (1) said character entry box drawn with said dot texture and (2) a written character and (3) said title character;

a character detection step of removing entry-box data formed of the dot texture from the character and box data input in the input step either by prior deletion of each dot constituting the dot texture to that of character data in a contraction process or by removal of a linked component smaller than a predetermined threshold, to detect character data of the written character;

a character-pattern removing step of removing the character data detected in the character detection step from the character and box data input in the input step according to the character and box data to generate the entry-box data;

an expansion step of applying an expansion process to a pattern obtained in the character detection step, to an extent in which adjacent dots become linked;

an entry-box detection step of integrating or accumulating the entry-box data obtained by removing the character data detected in the character detection step from the character and box data input in the input step, in the row direction or in the column direction to obtain a marginal distribution, and of obtaining entry-box-position data from the marginal distribution along a row or a column to detect the entry-box-position data which indicates a position where a character is to be written;

a relating step of relating the character and the entry box to each other according to the character data detected in the character detection step and the entry-box-position data detected in the entry-box detection step to extract a character pattern for each character; and a recognition step of recognizing the title character in a title obtained in the expansion step in the image, and recognizing each written character according to each character pattern extracted in the relating step, and a storage step of storing the title character recognized by the recognition step, and storing each written character recognized by the recognition step by related to the character entry box.

19. The medium of claim 18 wherein said first direction is perpendicular to said second direction.

20. A recording medium readable by a computer, having recorded thereon a document processing program for instructing a machine for processing a character input document, wherein said character input document includes a character entry box having a central region and a peripheral region enclosing said central region, said peripheral region of said character entry box including a dot texture, said central region of said character entry box excluding said dot texture, said dot texture defining an array of dots, said array of dots including at least two parallel rows of dots aligned along a first direction, and at least two parallel rows of dots aligned along a second direction, said first direction not parallel to said second direction, said program designed to cause a computer to perform steps comprising:

an input step of inputting an image which includes (1) said entry box drawn with said dot texture and (2) a written character;

wherein additional information is embedded in at least one of variations of dot sizes of dots of said dot texture, distance between adjacent dots of said dot texture, and different distances between different adjacent dots of said dot texture;

a character detection step of removing entry-box data formed of the dot texture from the character and box data input in the input step either by prior deletion of each dot constituting the dot texture to that of character data in a contraction process or by removal of a linked component smaller than a predetermined threshold, to detect character data of the written character;

a character-pattern removing step of removing the character data detected in the character detection step from the character and box data input in the input step according to the character and box data to generate the entry-box data;

a determination step of detecting a change in the set of dots of the entry box according to the entry-box data obtained in the character-pattern removing step, to determine the additional information embedded in the entry box;

an entry-box detection step of integrating or accumulating the entry-box data obtained by removing the character data detected in the character detection step from the character and box data input in the input step, in the row direction or in the column direction to obtain a marginal distribution, and of obtaining entry-box-position data from the marginal distribution along a row or a column to detect the entry-box-position data which indicates a position where a character is to be written;

a relating step of relating the character and the entry box to each other according to the character data detected in the character detection step and the entry-box-position data detected in the entry-box detection step to extract a character pattern for each character; and a recognition step of recognizing each written character according to each character pattern extracted in the relating step, and a storage step of storing the additional information determined by the determination step, and storing each written character recognized by the recognition step by related to the character entry box.

21. The medium of claim 20 wherein said first direction is perpendicular to said second direction.

22. A document processing program stored in a computer readable medium, said program designed to process an image of a character input document, wherein said character input document includes a character entry box having a central region and a peripheral region enclosing said central region, said peripheral region of said character entry box including a dot texture, said central region of said character entry box excluding said dot texture, said dot texture defining an array of dots, said array of dots including at least two parallel rows of dots aligned along a first direction, and at least two parallel rows of dots aligned along a second direction, said first direction not parallel to said second direction, and a title character drawn with the dot texture of a line formed of a set of dots arranged two dimensionally and having a width which includes a plurality of dots, said program designed to cause a computer to perform steps comprising:
- an input step of inputting an image which includes (1) said entry box drawn with said dot texture and (2) a written character, and (3) said title character;
- a character detection step of removing entry-box data formed of the dot texture from the character and box data input in the input step either by prior deletion of each dot constituting the dot texture to that of character data in a contraction process or by removal of a linked component smaller than a predetermined threshold, to detect character data of the written character;
- a character-pattern removing step of removing the character data detected in the character detection step from the character and box data input in the input step according to the character and box data to generate the entry-box data;
- an expansion step of applying an expansion process to a pattern obtained in the character detection step, to an extent in which adjacent dots become linked;
- an entry-box detection step of integrating or accumulating the entry-box data obtained by removing the character data detected in the character detection step from the character and box data input in the input step, in the row direction or in the column direction to obtain a marginal distribution, and of obtaining entry-box-position data from the marginal distribution along a row or a column to detect the entry-box-position data which indicates a position where a character is to be written;
- a relating step of relating the character and the entry box to each other according to the character data detected in the character detection step and the entry-box-position data detected in the entry-box detection step to extract a character pattern for each character; and
- a recognition step of recognizing the title character in a title obtained in the expansion step in the image, and recognizing each written character according to each character pattern extracted in the relating step, and
- a storage step of storing the title character recognized by the recognition step, and storing each written character recognized by the recognition step by related to the character entry box.

23. The program of claim 22 wherein said first direction is perpendicular to said second direction.

24. A document processing program stored in a computer readable medium, said program designed to process an image of a character input document, wherein said character input document includes a character entry box having a central region and a peripheral region enclosing said central region, said peripheral region of said character entry box including a dot texture, said central region of said character entry box excluding said dot texture, said dot texture defining an array of dots, said array of dots including at least two parallel rows of dots aligned along a first direction, and at least two parallel rows of dots aligned along a second direction, said first direction not parallel to said second direction, said program designed to cause a computer to perform steps comprising:
- an input step of inputting an image which includes (1) said entry box drawn with said dot texture and (2) a written character;
- wherein additional information is embedded in at least one of variations of dot sizes of dots of said dot texture, distance between adjacent dots of said dot texture, and different distances between different adjacent dots of said dot texture;
- a character detection step of removing entry-box data formed of the dot texture from the character and box data input in the input step either by prior deletion of each dot constituting the dot texture to that of character data in a contraction process or by removal of a linked component smaller than a predetermined threshold, to detect character data of the written character;
- a character-pattern removing step of removing the character data detected in the character detection step from the character and box data input in the input step according to the character and box data to generate the entry-box data;
- a determination step of detecting a change in the set of dots of the entry box according to the entry-box data obtained in the character-pattern removing step, to determine the additional information embedded in the entry box;
- an entry-box detection step of integrating or accumulating the entry-box data obtained by removing the character data detected in the character detection step from the character and box data input in the input step, in the row direction or in the column direction to obtain a marginal distribution, and of obtaining entry-box-position data from the marginal distribution along a row or a column to detect the entry-box-position data which indicates a position where a character is to be written;
- a relating step of relating the character and the entry box to each other according to the character data detected in the character detection step and the entry-box-position data detected in the entry-box detection step to extract a character pattern for each character; and
- a recognition step of recognizing each written character according to each character pattern extracted in the relating step, and
- storage step of storing the additional information determined by the determination step, and storing each written character recognized by the recognition step by related to the character entry box.

25. The program of claim 24 wherein said first direction is perpendicular to said second direction.

26. A document processing apparatus for processing a character input document, said character input document including a character entry box having a central region and a peripheral region enclosing said central region, said peripheral region of said character entry box including a dot texture, said central region of said character entry box excluding said dot texture, said dot texture defining an array of dots, said array of dots including at least two parallel rows of dots aligned along a first direction, and at least two parallel rows of dots aligned along a second direction, said first direction not parallel to said second direction, and a title character drawn with the dot texture of a line formed of a set of dots arranged two dimensionally and having a width which includes a plurality of dots, comprising:

an input means for inputting an image which includes (1) said character entry box drawn with said dot texture and (2) a written character and (3) said title character;

a character detection means for removing entry-box data formed of the dot texture from the character and box data input in the input means either by prior deletion of each dot constituting the dot texture to that of character data in a contraction process or by removal of a linked component smaller than a predetermined threshold, to detect character data of the written character;

a character-pattern removing means for removing the character data detected in the character detection means from the character and box data input in the input means according to the character and box data to generate the entry-box data;

an expansion means for applying an expansion process to a pattern obtained in the character detection means, to an extent in which adjacent dots become linked;

an entry-box detection means for integrating or accumulating the entry-box data obtained by removing the character data detected in the character detection means from the character and box data input in the input means, in the row direction or in the column direction to obtain a marginal distribution, and of obtaining entry-box-position data from the marginal distribution along a row or a column to detect the entry-box-position data which indicates a position where a character is to be written;

a relating means for relating the character and the entry box to each other according to the character data detected in the character detection means and the entry-box-position data detected in the entry-box detection means to extract a character pattern for each character; and a recognition means for recognizing the title character in a title obtained in the expansion means in the image, and recognizing each written character according to each character pattern extracted in the relating means, and a storage means for storing the title character recognized by the recognition means, and storing each written character recognized by the recognition means by related to the character entry box.

27. A document processing apparatus for processing a character input document, said character input document including a character entry box having a central region and a peripheral region enclosing said central region, said peripheral region of said character entry box including a dot texture, said central region of said character entry box excluding said dot texture, said dot texture defining an array of dots, said array of dots including at least two parallel rows of dots aligned along a first direction, and at least two parallel rows of dots aligned along a second direction, said first direction not parallel to said second direction;

wherein additional information is embedded in at least one of variations of dot sizes of dots of said dot texture, distance between adjacent dots of said dot texture, and different distances between different adjacent dots of said dot texture;

said apparatus comprising:

an input means for inputting an image which includes (1) said character entry box drawn with said dot texture and (2) a written character;

a character detection means for removing entry-box data formed of the dot texture from the character and box data input in the input means either by prior deletion of each dot constituting the dot texture to that of character data in a contraction process or by removal of a linked component smaller than a predetermined threshold, to detect character data of the written character;

a character-pattern removing means for removing the character data detected in the character detection means from the character and box data input in the input means according to the character and box data to generate the entry-box data;

a determination means for detecting a change in the set of dots of the entry box according to the entry-box data obtained in the character-pattern removing means, to determine the additional information embedded in the entry box;

an entry-box detection means for integrating or accumulating the entry-box data obtained by removing the character data detected in the character detection means from the character and box data input in the input means, in the row direction or in the column direction to obtain a marginal distribution, and of obtaining entry-box-position data from the marginal distribution along a row or a column to detect the entry-box-position data which indicates a position where a character is to be written;

a relating means for relating the character and the entry box to each other according to the character data detected in the character detection means and the entry-box-position data detected in the entry-box detection means to extract a character pattern for each character; and a recognition means for recognizing each written character according to each character pattern extracted in the relating means, and a storage means for storing the additional information determined by the determination means, and storing each written character recognized by the recognition means by related to the character entry box.

28. The apparatus of claim 26 or 27 wherein said first direction is perpendicular to said second direction.

29. A document processing apparatus according to claim 26 or 27, further comprising output means for relating the character recognized by the recognition means to the entry box and for outputting them.

* * * * *